(12) United States Patent
Stocker

(10) Patent No.: US 9,248,535 B2
(45) Date of Patent: Feb. 2, 2016

(54) MACHINE TOOLS AND METHODS OF OPERATION THEREOF

(75) Inventor: Mark Stocker, Keighley (GB)

(73) Assignee: Fives Landis Limited, Keighley (GB)

( * ) Notice: Subject to any disclaimer, the term of this patent is extended or adjusted under 35 U.S.C. 154(b) by 0 days.

(21) Appl. No.: 13/511,161

(22) PCT Filed: Dec. 20, 2010

(86) PCT No.: PCT/GB2010/052155
§ 371 (c)(1),
(2), (4) Date: May 22, 2012

(87) PCT Pub. No.: WO2011/077127
PCT Pub. Date: Jun. 30, 2011

(65) Prior Publication Data
US 2012/0276813 A1  Nov. 1, 2012

(30) Foreign Application Priority Data
Dec. 22, 2009  (GB) .................. 0922392.6

(51) Int. Cl.
| | | |
|---|---|---|
| B24B 41/02 | (2006.01) | |
| B24B 41/06 | (2012.01) | |
| B24B 49/00 | (2012.01) | |
| B23Q 1/01 | (2006.01) | |
| B23Q 1/54 | (2006.01) | |
| B23Q 1/36 | (2006.01) | |
| B24B 5/04 | (2006.01) | |
| B24B 27/00 | (2006.01) | |
| B24B 27/04 | (2006.01) | |

(52) U.S. Cl.
CPC .............. *B23Q 1/5406* (2013.01); *B23Q 1/015* (2013.01); *B23Q 1/36* (2013.01); *B24B 5/04* (2013.01); *B24B 27/0084* (2013.01); *B24B 27/04* (2013.01); *B24B 41/02* (2013.01); *B24B 49/00* (2013.01); *B23Q 2210/002* (2013.01)

(58) Field of Classification Search
CPC ........ B24B 1/00; B24B 49/00; B24B 41/005; B24B 41/02; B24B 41/06; B24B 27/04; B24B 27/0084; B23Q 1/01; B23Q 1/015; B23Q 2210/002
USPC ........................................ 451/1, 5, 11, 28, 41
See application file for complete search history.

(56) References Cited

U.S. PATENT DOCUMENTS

| | | | | |
|---|---|---|---|---|
| 3,712,752 | A * | 1/1973 | Varga | 408/42 |
| 3,879,898 | A | 4/1975 | Loxham et al. | |
| 4,068,413 | A * | 1/1978 | Suddarth | 451/159 |
| 4,115,956 | A * | 9/1978 | Huffman | 451/4 |
| 4,186,529 | A * | 2/1980 | Huffman | 451/4 |
| 4,461,121 | A * | 7/1984 | Motzer et al. | 451/5 |
| 4,608,643 | A * | 8/1986 | Breitenstein et al. | 700/164 |
| 4,679,471 | A * | 7/1987 | Wauchope et al. | 82/12 |
| 4,760,672 | A * | 8/1988 | Darcangelo et al. | 451/42 |
| 4,833,764 | A * | 5/1989 | Muller | 29/40 |
| 5,231,587 | A * | 7/1993 | Frost | 700/164 |
| 5,839,862 | A | 11/1998 | Hayashi et al. | |
| 6,553,875 | B1 | 4/2003 | Miyano | |
| 7,874,895 | B1 * | 1/2011 | Toycen | 451/11 |
| 8,151,437 | B2 * | 4/2012 | Muller et al. | 29/563 |
| 2004/0035266 | A1 | 2/2004 | Montesanti et al. | |
| 2007/0096763 | A1 * | 5/2007 | Ehrmann et al. | 324/765 |

FOREIGN PATENT DOCUMENTS

| | | |
|---|---|---|
| DE | 199 02 137 C1 | 6/2000 |
| EP | 0 305 735 A2 | 3/1989 |
| EP | 0 816 012 A1 | 1/1998 |
| EP | 1 048 395 A2 | 11/2000 |
| GB | 2 408 224 A | 5/2005 |
| GB | 2 441 312 A | 3/2008 |
| GB | 2 456 843 A | 7/2009 |
| WO | 01/56739 A1 | 8/2001 |
| WO | 2008/024962 A2 | 2/2008 |
| WO | 2009/093064 A1 | 7/2009 |

OTHER PUBLICATIONS

European Patent Office, EPO Machine Translation of Application No. EP0305735A2, retrieved from Espacenet on Apr. 10, 2012, http://translationportal.epo.org/emtp/translate/?ACTION= description-retrieval&COUNTRY=EP&FORMAT=docdb&KIND=A2&LOCALE=en_EP&NUMBER=0305735&OPS=ops.epo.org&ENGINE=google&SRCLANG=de&TRGLANG=en (13 pages).

European Patent Office, EPO Machine Translation of Application No. EP0816012A1, retrieved from Espacenet on Apr. 10, 2012, http://translationportal.epo.org/emtp/translate/?ACTION= description-retrieval&COUNTRY=EP&FORMAT=docdb&KIND=A1& LOCALE=en_EP&NUMBER=0816012&OPS=ops.epo.org& ENGINE=google&SRCLANG=de&TRGLANG=en (10 pages).

European Patent Office, EPO Machine Translation of Application No. DE19902137, retrieved from Espacenet on Apr. 10, 2012, http://translationportal.epo.org/emtp/translate/?ACTION=description-retrieval&COUNTRY=DE&FORMAT=docdb&KIND=C1& LOCALE=en_EP&NUMBER=19902137&OPS=ops.epo.org& ENGINE=google&SRCLANG=de&TRGLANG=en (8 pages).

United Kingdom Intellectual Property Office, Patents Act 1977 Combined Search and Examination Report Under Sections 17 & 18(3), Application No. GB0922392.6, dated Jun. 17, 2010 (3 pages).

United Kingdom Intellectual Property Office, Patents Act 1977 Examination Report Under Section 18 (3), Application No. GB0922392.6, dated Aug. 30, 2011 (3 pages).

United Kingdom Intellectual Property Office, Patents Act 1977 Examination Report Under Section 18 (3), Application No. GB0922392.6, dated Mar. 30, 2012 (2 pages).

European Patent Office, International Search Report and Written Opinion of the International Searching Authority, International Application No. PCT/GB2010/052155, dated Nov. 30, 2011 (12 pages).

European Patent Office, International Search Report and Written Opinion of the International Searching Authority, International Application No. PCT/GB2009/050041, dated Apr. 17, 2009 (10 pages).

United States Patent and Trademark Office, Non-Final Office Action, U.S. Appl. No. 12/863,786, dated Apr. 29, 2013 (7 pages).

United States Patent and Trademark Office, Final Office Action, U.S. Appl. No. 12/863,786, dated Oct. 23, 2013 (6 pages).

United States Patent and Trademark Office, Office Action, U.S. Appl. No. 12/863,786, mailed on Apr. 4, 2014 (11 pages).

European Patent Office, Extended European Search Report, Application No. 13184618.0, mailed on Jul. 21, 2014 (5 pages).

United States Patent and Trademark Office, Office Action, U.S. Appl. No. 12/863,786, mailed on Mar. 20, 2015 (7 pages).

United States Patent and Trademark Office, Final Office Action, U.S. Appl. No. 12/863,786, dated Nov. 27, 2015 (11 pages).

* cited by examiner

*Primary Examiner* — Eileen Morgan

(74) *Attorney, Agent, or Firm* — Wood, Herron & Evans, LLP

(57) ABSTRACT

A machine tool is provided which comprises a machine base; a first support provided on a first rotational machine axis, the first rotational axis being mounted on the base in a fixed position relative to the base; a second support provided on a second rotational machine axis, the second rotational axis being mounted on the base in a fixed position relative to the base, wherein the axis of rotation of the second rotational axis is parallel to and spaced laterally from the axis of rotation of the first rotational axis. A mount is carried by a support arm on the second support, with the support arm being moveable relative to the second support about a rotary axis. A control arrangement is operable to control the orientation of the first support relative to the axis of rotation of the first rotational axis, and the orientation of the mount relative to the axis of rotation of the second rotational axis and its rotational position about the rotary axis, so as to govern the position and orientation of the first support and the mount relative to each other. Combination of motion about three rotational axes in this way facilitates versatile and accurate control of the relative orientations of the first support and the mount on the second support. The machine base may include a central support located between the machine axes, with the machine axes mounted onto opposite sides of the support.

30 Claims, 22 Drawing Sheets

MACHINE TOOLS AND METHODS OF OPERATION THEREOF

CROSS REFERENCE TO RELATED APPLICATION

This application is related to co-pending U.S. patent application Ser. No. 12/863,786, filed Sep. 14, 2010, entitled "Machine Tools And Methods Of Operation Thereof."

FIELD OF THE INVENTION

The present invention relates to machine tools and in particular, reduction of alignment errors in such tools.

BACKGROUND OF THE INVENTION

There are many applications for machine tools that require the motion of two points in space to be controlled relative to each other, in both position and angle, over a swept area or volume. It is desirable to minimise the number of machine axes involved to optimise this control. It is also desirable to maintain a very tight stiffness loop between the two points and ideally a constant value of stiffness in the loop as the position and angle of the points are adjusted. This improves the level of accuracy and repeatability of the motion.

Existing machine tools often use long linear guide rails to enable contact between a cutting tool (such as a grinding wheel) and a workpiece at any position along the workpiece's length. Shorter linear guide rails may be carried by the long rails in order to facilitate motion of a cutting tool towards or away from the workpiece, in a direction orthogonal to the long rails. These stacked rails (or axes) introduce unwanted compliance, reducing the tool-to-component stiffness. This in turn leads to reduced component quality, in terms of its dimensional precision and finish. Also, the long linear guide rails typically need to be least as long as the workpiece to be machined. This often results in an axis with a poor bearing ratio where the axis is most compliant in the direction of the cutting force. This problem is compounded when an orthogonal infeed axis is stacked upon the long axis.

The use of stacked axes is also problematic if on-axis position encoders are employed. The taller the stack of axes, the greater the distance between the points of interest and the encoders. This results in "Abbe offset" errors which reduce the intrinsic precision of the machine tools.

Furthermore, the use of orthogonal stacked linear axes requires time consuming and expensive alignment to maintain orthogonality between the axes and to minimise the pitch, yaw and roll errors for each axis.

These long linear axes also require long telescopic covers that are expensive, introduce friction, prone to failure and furthermore may influence the precision of linear motion (for example its straightness, positioning precision and repeatability).

The present invention seeks to overcome the problems above associated with use of long guide rails, and reduce the need for stacked, orthogonal axes.

International publication no. WO2009/093064 (in the name of the present applicant) describes a machine tool which comprises a machine base, a first support mounted on a first rotational machine axis on the base, and a second support mounted on a second rotational machine axis on the base. The second rotational axis is parallel to and spaced laterally from the first rotational axis and carries a mount moveable relative to the second support along a first linear machine axis orthogonal to the second rotational axis. A control arrangement is provided which is operable to control the orientation of the first support on the first rotational axis, and the orientation of the mount relative to the second rotational axis and its location along the linear axis, so as to govern the position and orientation of the first support and the mount relative to each other. This can be achieved without needing long linear axes and a stacked linear axis, thereby overcoming problems associated with the known configurations discussed above.

SUMMARY OF THE INVENTION

The present invention provides a machine tool comprising:
a machine base;
a first support provided on a first rotational machine axis, the first rotational axis being mounted on the base in a fixed position relative to the base;
a second support provided on a second rotational machine axis, the second rotational axis being mounted on the base in a fixed position relative to the base, wherein the axis of rotation of the second rotational axis is parallel to and spaced laterally from the axis of rotation of the first rotational axis;
a mount carried by a support arm on the second support, the support arm being moveable relative to the second support about a rotary axis; and
a control arrangement operable to control the orientation of the first support relative to the axis of rotation of the first rotational axis, and the orientation of the mount relative to the axis of rotation of the second rotational axis and its rotational position about the rotary axis, so as to govern the position and orientation of the first support and the mount relative to each other.

This configuration provides benefits associated with embodiments described in WO2009/093064 which flow from provision of two rotational machine axes provided a fixed distance apart. It differs in that movement of the mount relative to the second support is about a rotary axis, with the mount spaced from the rotary axis by a support arm, rather than the mount being moveable relative to the second support along a linear machine axis.

As described in WO2009/093064, combination of two rotational machine axes and a linear machine axis facilitates versatile control of the relative orientations of the first support and a mount on the second support over a swept area. The linear component of motion in a plane perpendicular to the first and second rotational axes advantageously combines with their rotary motion so as for example to enable grinding of cylindrical surfaces by a grinding machine embodying this concept.

The inventor has realised that the degree of freedom afforded by the linear machine axis could actually be facilitated by a further rotary axis instead, thus obviating the need for a linear axis for this function. With appropriate control by the control arrangement, rotation of the mount about its axis can be achieved using an associated drive arrangement to provide the required linear component of motion of the mount relative to the first support. Thus, in some embodiments, the machine tool employs these three rotary axes only, thereby facilitating relative movement between the first support and the mount whilst reducing the susceptibility to alignment errors.

The use of a third rotary axis in place of a linear axis means that all three axes can be rotary axes which can be sealed using labyrinths that do not introduce frictional forces. This is in contrast to the linear sliding guard or cover required by a linear axis. These guards or covers tend to be heavy, expensive and introduce non-repeatable frictional forces.

Furthermore, the use of a third rotary axis is likely to mean that a smaller mass is moving to create the desired linear component of motion. When a linear axis is employed, a relative large mass including the carriage moving along the axis moves across the second support axis, which alters the polar moment of inertia of the second support assembly to a greater extent. This may in turn require the rotary axis servo loops to be "tuned down" to prevent servo instability over the range of polar inertias.

The term "machine axis" denotes a physical machine axis herein, as opposed to a reference axis. Each machine axis has two portions which are driven in use to move relative to each other, about or along a reference axis, by associated drive arrangements governed by the control arrangement.

With a grinding wheel mounted on the mount, the claimed invention facilitates plunge, taper, angle and interpolation grinds over the full length of a workpiece held on the first support. It is particularly suitable for grinding slender, multi-featured components such as cams and crankshafts.

The longitudinal axis of a workpiece mounted on the other support may be spaced from the support's rotational axis, for example with the workpiece near the periphery of the support so that its full length is readily presentable to a tool on the one support. More particularly, the longitudinal axis of the workpiece may be located in an orientation orthogonal to a radial line extending outwards from the respective rotational axis.

The third rotary axis may be orthogonal to the axis of rotation of the second rotational machine axis. Alternatively, it may be in an orientation parallel to the axis of rotation of the second rotational machine axis.

The supports may be independently rotatable about their respective rotational axes. Alternatively, they may be arranged for rotation such that rotational movement of one support in one direction is substantially matched by equivalent rotation of the other support, but in the opposite direction.

The rotational position of the supports may be selectively lockable relative to the machine base. For example, during a plunge grinding operation, only one axis, namely the rotary axis of the mount is "live", making the dynamic stiffness of the machine tool during grinding significantly greater than that of a conventional machine tool employing linear guide rails only. Each rotary axis may be lockable for example by servo holding, using a brake, or by turning off associated air or hydrostatic bearings so as effectively to ground the respective axes.

In preferred embodiments, the supports are supported on the machine base by rotary bearings, preferably by both journal and thrust bearings. Large thrust bearings may be mounted directly upon the machine base to provide highly stiff, damped axes with a very good bearing ratio in all directions resulting in axisymmetric stiffness characteristics. A flat, planar machine base can readily be constructed upon which to mount the two rotary axis thrust planes.

The three rotary axes may employ common components, reducing the overall machine cost. For example, they may employ the same or similar motor, drive, encoder and/or bearing components.

Preferably the bearings of the first and second rotational axes and the rotary axis associated with the mount are in the form of hydrostatic bearings. Linear bearings usually have larger bearing gaps than rotary bearings and require that thicker (more viscous) oil is used in order to keep flow rates down to an acceptable level. For practical purposes, all the machine axes (including a grinding spindle if present) preferably use the same hydrostatic oil. The use of a thicker oil leads to greater heating of the oil in a high speed grinding spindle. This can lead to spindle overheating issues. Thus a thinner oil is preferable for grinding spindles. If all three machine axes have rotary, hydrostatic bearings, then all the bearings can have smaller bearing gaps and use a lower viscosity oil which is beneficial for the grinding spindle.

Rotation of the supports relative to the machine base may be effected by respective direct drive motors.

Preferably, each support includes a rotation sensor for providing a signal related to the rotational position of the respective support relative to the machine base. The control arrangement may receive the signals from the rotation sensors and control the rotational positions of the supports. In particular, such a control arrangement may be configurable to compensate for inaccuracy in the motion of these supports during a machining operation. This error correction may be employed for example to maintain the trueness of relative motion between a cutting tool and a workpiece, rather than merely rely on the straightness of a machine's linear axes.

In a preferred implementation, one of the supports carries a tool mount, which may be in the form of a grinding spindle or wheelhead adapted to rotate a grinding wheel mounted thereon for example. The wheelhead may be carried by the support arm, and orientated such that the rotational axis of the grinding wheel is parallel to the rotary axis. Alternatively, the rotational axis of the grinding wheel may be orthogonal to the rotary axis.

Alternatively, or in addition, a support may carry a tool such as a turning tool, one or more gauges, or sensors, such as a polishing tool inspection sensor for example. Combinations of tools, gauges, dress tools and the like may be provided on each support and selected as appropriate by rotation of the respective support.

Preferably, the centreline of the mount (and/or centre of mass of the tool mount and the associated tool) is higher above the machine base than the workpiece centreline (and/or its centre of mass). This results in the forces exerted on the workpiece by a tool being directed downwardly towards the machine base, thereby increasing the stability of the machine.

Two tool mounts may be carried by one of the supports, each moveable relative to the support independently of the other. In this way, two features may be machined on a workpiece simultaneously.

Each tool mount may be carried by a respective support arm on the second support, each support arm being independently moveable relative to the second support about a respective rotary axis. In some embodiments, each support arm is mounted on a common shaft. At least one of the support arms may also be moveable relative to the one support along a linear axis so as to alter the spacing of the tool mounts.

The other support may be arranged to support an elongate workpiece with its longitudinal axis in a plane orthogonal to the axes of rotation of the rotational machine axes.

According to another aspect, the present invention provides a machine tool comprising:
   a machine base;
   a first support provided on a first rotational machine axis, the first rotational axis being mounted on the base in a fixed position relative to the base;
   a second support provided on a second rotational machine axis, the second rotational axis being mounted on the base in a fixed position relative to the base, wherein the axis of rotation of the second rotational axis is parallel to and spaced laterally from the axis of rotation of the first rotational axis;
   a mount carried by the second support and moveable relative to the second support; and a control arrangement operable to control the orientation of the first support relative to the axis of rotation of the first rotational axis, and the orientation of the mount relative to the axis of rotation of the second rotational axis, so as to govern the position and orientation of the first support and the mount relative to each other, wherein the machine base comprises a central support located between the machine axes, and the machine axes are mounted onto opposite sides of the support.

Thus, forces generated as a result of one rotational machine axis acting on the other are resisted in tension and compression, rather than in bending (as would be the case with known machine bed configurations). Furthermore, the stiffness and thermal loops remain substantially independent of the orientations of the machine axes.

Preferably, the weight of both of the machine axes is substantially supported by the central support.

The present invention further provides a method of machining a workpiece using a machine tool as defined above, comprising the steps of:

mounting a workpiece on one of the supports;
rotating the supports to present a selected portion of the workpiece to a cutting tool carried by the other support; and
machining the selected portion of the workpiece with the cutting tool.

In this way, the first and second rotational axes may be used to bring a cutting tool to the required position along a workpiece. These rotary axes may then be locked and the third rotary axis employed to feed a cutting tool into the workpiece.

The method may also include the further steps of:
rotating the supports in opposite directions and moving the workpiece and/or the cutting tool relative to the respective support to engage a second portion of the workpiece with the cutting tool; and
machining the second portion of the workpiece with the cutting tool.

With synchronisation of the rotation of the supports and the movement of the workpiece and/or the cutting tool relative to the respective support, a cutting tool may be traversed along an elongate workpiece, enabling the generation of complex component profiles.

The present invention also provides a method of machining a workpiece using a machine tool as defined above, comprising the steps of:

mounting a workpiece having a longitudinal axis on one of the supports;
rotating the other support such that the rotational axis of a grinding wheel carried by the other support is non-parallel with respect to the longitudinal axis of the workpiece; and
grinding the workpiece with the grinding wheel with the rotational axis of the grinding wheel at an angle to the longitudinal axis of the workpiece.

A further method is provided in accordance with the invention which comprises the steps of:
(a) mounting a workpiece on one of the supports;
(b) mounting a tool having a reference axis on the other support; and
(c) moving the first support relative to the axis of rotation of the first rotational axis, and the mount relative to the axis of rotation of the second rotational axis and the rotary axis, such that a predetermined curved or profiled surface is defined on the workpiece whilst maintaining the reference axis of the tool perpendicular to said surface.

A method of calibrating a machine tool as defined above is also provided, comprising the steps of:

(a) mounting a laser light source on one of the supports;
(b) emitting a laser beam from the light source which is incident on an optical device supported by the other support;
(c) monitoring the laser beam path with respect to the positions of the supports as measured by respective rotation sensors;
(d) calculating positioning errors; and
(e) calibrating the control arrangement so as to reduce the errors.

The optical device may be a detector, or a reflector for reflecting incident laser light back towards a detector mounted on the other support, for example. In a preferred implementation, dual laser beams are employed and interferometry used to measure the distance between the laser light source and the optical device.

The use of two primary rotational axes enables the use of software error correction to maintain position, straightness, and angular motion control between the two points of interest, rather than having to rely upon the straightness of a machine's linear axes. During machine build, it is possible to measure the position of the interpolated linear motion between the two points and make software compensations.

The present invention has a wide range of potential applications in which the position and angle of two points relative to each other need to be controlled over a swept area or volume. In particular, it may be especially beneficial in the machining, inspection or positioning of complex components that require control of position or angle over a swept area or volume. One specific example is diamond turning where it is often necessary to maintain a cutting tool in a normal orientation relative to a surface being machined.

BRIEF DESCRIPTION OF THE DRAWINGS

A known machine tool configuration and embodiments of the invention will now be described by way of example with reference to the accompanying schematic drawings wherein.

It should be noted that the Figures are schematic only. The same reference signs are generally used to refer to corresponding or similar features in modified and different embodiments.

DETAILED DESCRIPTION OF THE INVENTION

Figure 1:
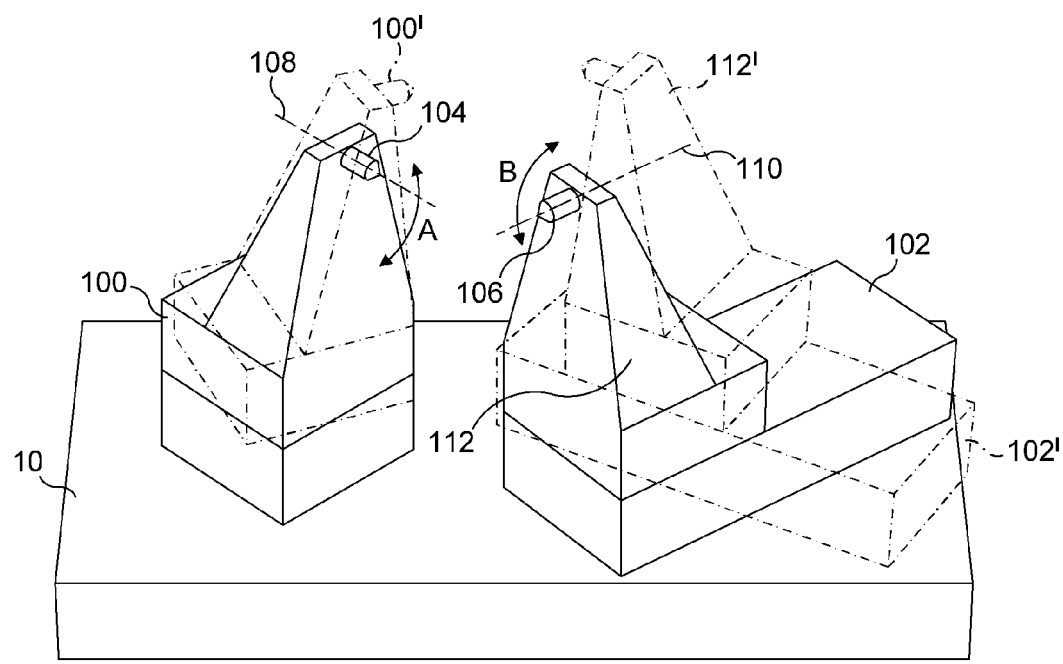
FIGS. 1 to 3 are perspective views of machine tools described in WO2009/093064.
Figure 2:
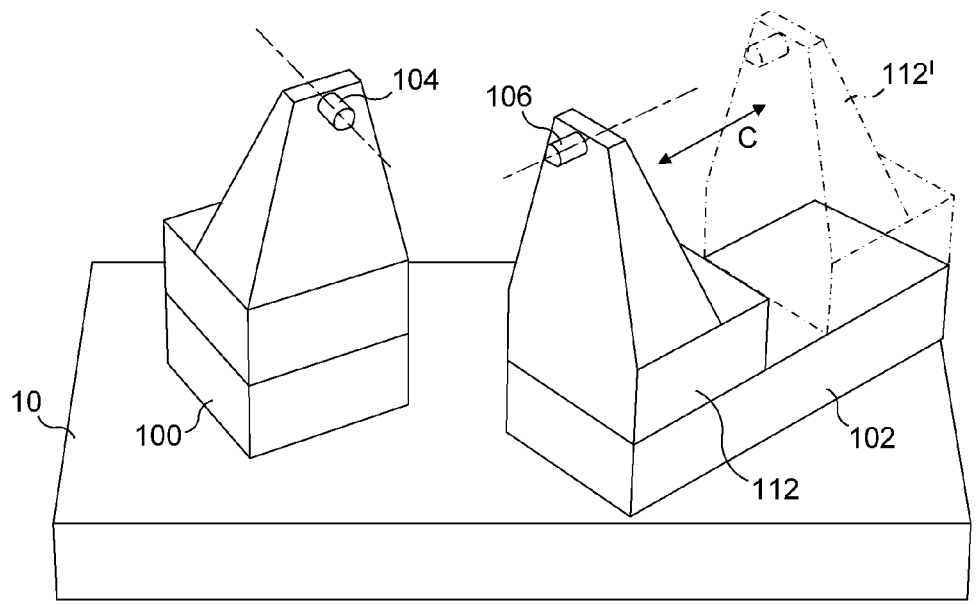
Figure 3:
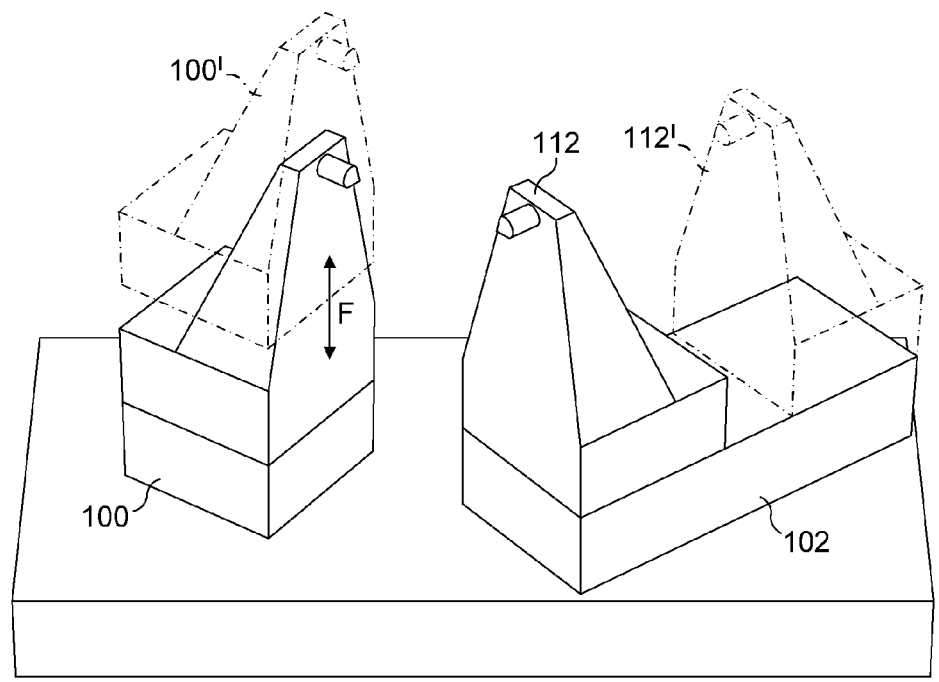

FIGS. 1 to 3 are perspective schematic representations of machine tools described in WO2009/093064. They include a machine base 10. First and second supports 100, 102 are mounted directly on the base for rotation about the axes of rotation of the respective rotational machine axes which are perpendicular to the plane of the machine base. Their rotational motion is indicated by arrows A and B respectively. Points 104 and 106 denote reference points associated with each support. Each point has a reference axis 108, 110 passing through it.

A mount 112 is carried by the second support 102 and is movable along a linear machine axis. Reference point 104 is on the first support, and reference point 106 is on mount 112, carried by the second support 102. Control of the position and orientation of the first support and the mount is considered herein with reference to points 104 and 106 and their associated reference axes 108 and 110.

Ghost representations 100', 102' and 112' of the first support, second support and mount are included in FIG. 1 to show different orientations thereof following rotation about their respective rotational machine axes. This illustrates movement to alter the angle between the reference axes 108 and 110.

FIG. 2 illustrates movement of mount 112 along its linear axis to a second position 112' shown in ghost outline. Arrow C denotes the direction of motion. This capability facilitates control of the distance between the two fixed points 104 and 106. Combination of the two rotary axes and one linear axis enables controlled motion of the points in both position and angle over a swept area.

FIG. 3 shows a machine tool configuration in which the first support 100 is also moveable along a linear machine axis F, which is parallel to its rotational axis. The position of the support following movement along this axis is shown by ghost outline 100'. This further dimension of movement facilitates control of the position and orientation of the first support and the mount relative to each other over a swept volume.

In embodiments of the present invention, the capabilities of the known machine tool configurations shown in FIGS. 1 to 3 are achievable by providing a mount on a support which is moveable relative to the support about a rotary axis, and spaced from the rotary axis by a support arm. A linear component of the motion of the mount about this rotary axis is employed to achieve the linear degree of freedom present in these known arrangements.

The use of the rotary axis to provide a horizontal component of motion for the mount is illustrated by FIGS. 4 to 9.

First and second supports 200, 202 are mounted directly on a machine base 10 for rotation about the axes of rotation of the respective rotational machine axes which are perpendicular to the plane of the machine base. Points 204 and 206 denote reference points associated with each support. A reference axis 214 passes through reference point 204.

A support arm 208 is carried out by the second support 202 and is moveable relative to the second support about a rotary axis 210.

Figure 4:
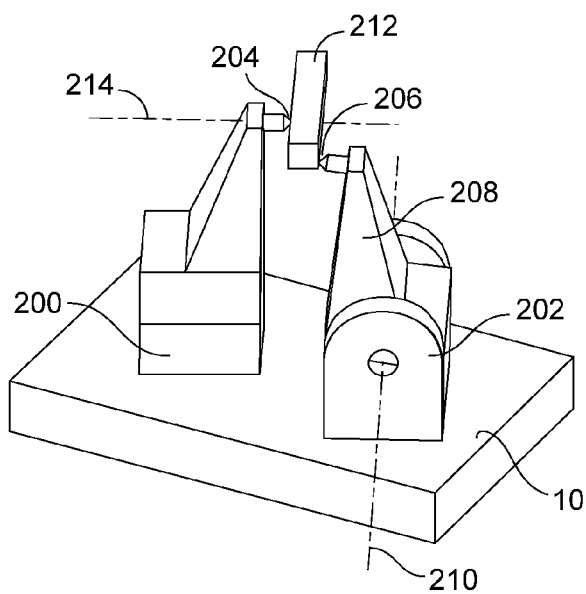
FIGS. 4 to 9 are perspective views of a machine tool embodying the present invention to illustrate its operation.
Figure 5:
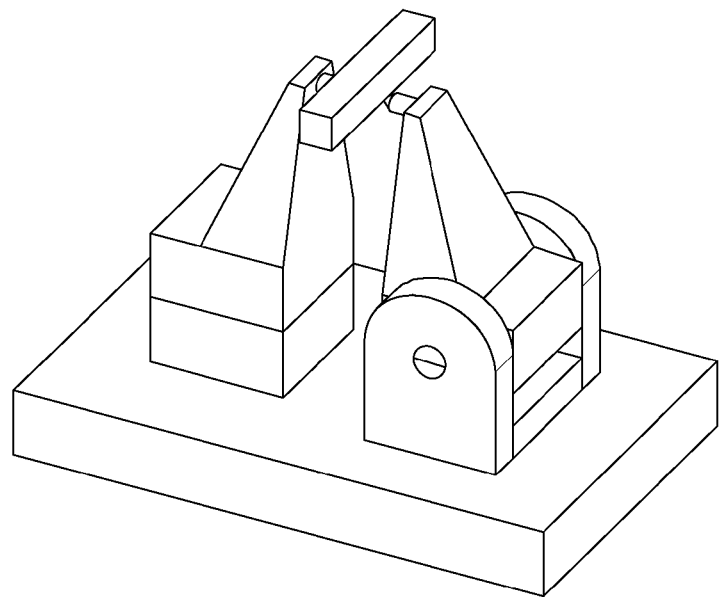
Figure 6:
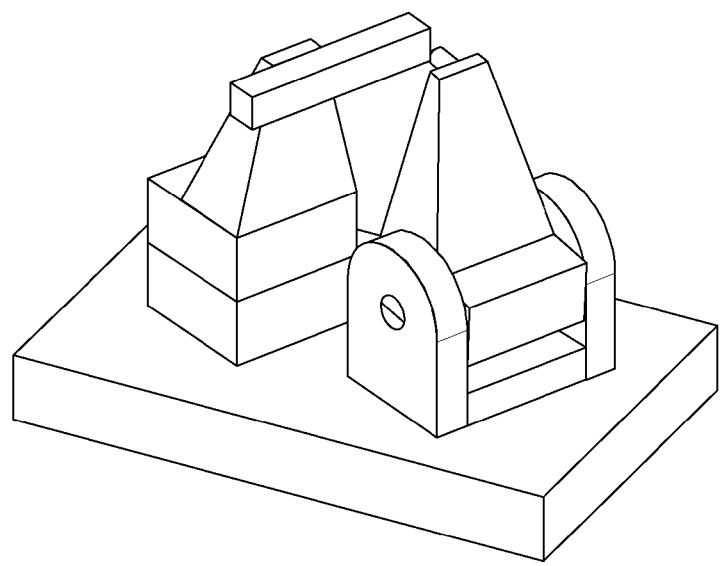

FIGS. 4 to 6 show successive positions of machine tool components as the reference points 204 and 206 move over the surface of a notional workpiece represented by a cuboidal work zone 212. As the supports rotate in opposite directions, a constant spacing between the reference points is maintained in the direction of reference axis 214 by rotation of the support arm about axis 210.

Figure 7:
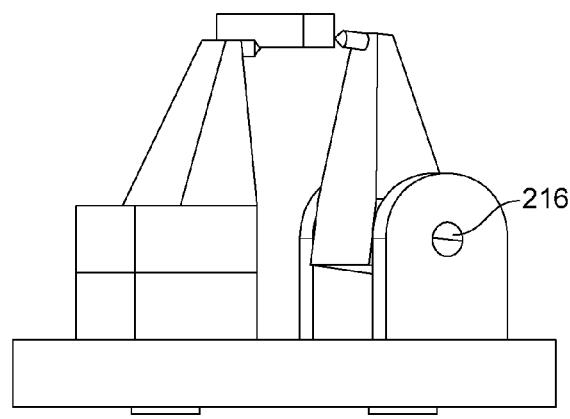
Figure 8:
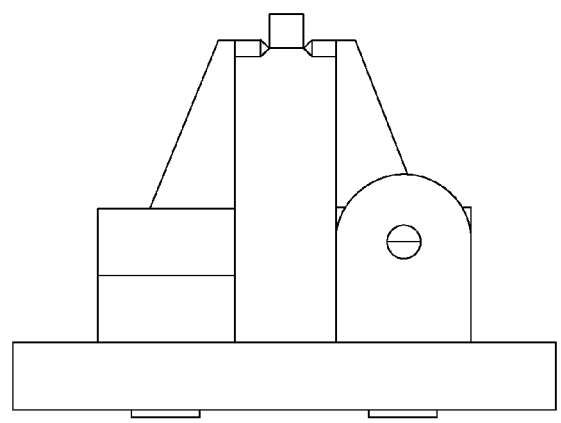
Figure 9:
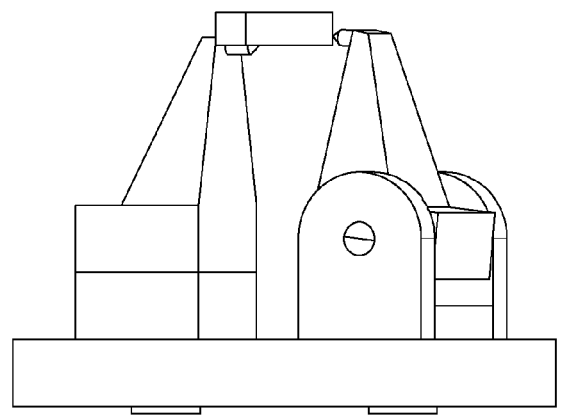

Side views of the machine tool orientations shown in FIGS. 4 to 6 are depicted in FIGS. 7 to 9. A reference line 216 marked on a portion of support arm 208 extending through support 202 highlights changes in the rotational position of the support arm relative to the support.

Figure 10:
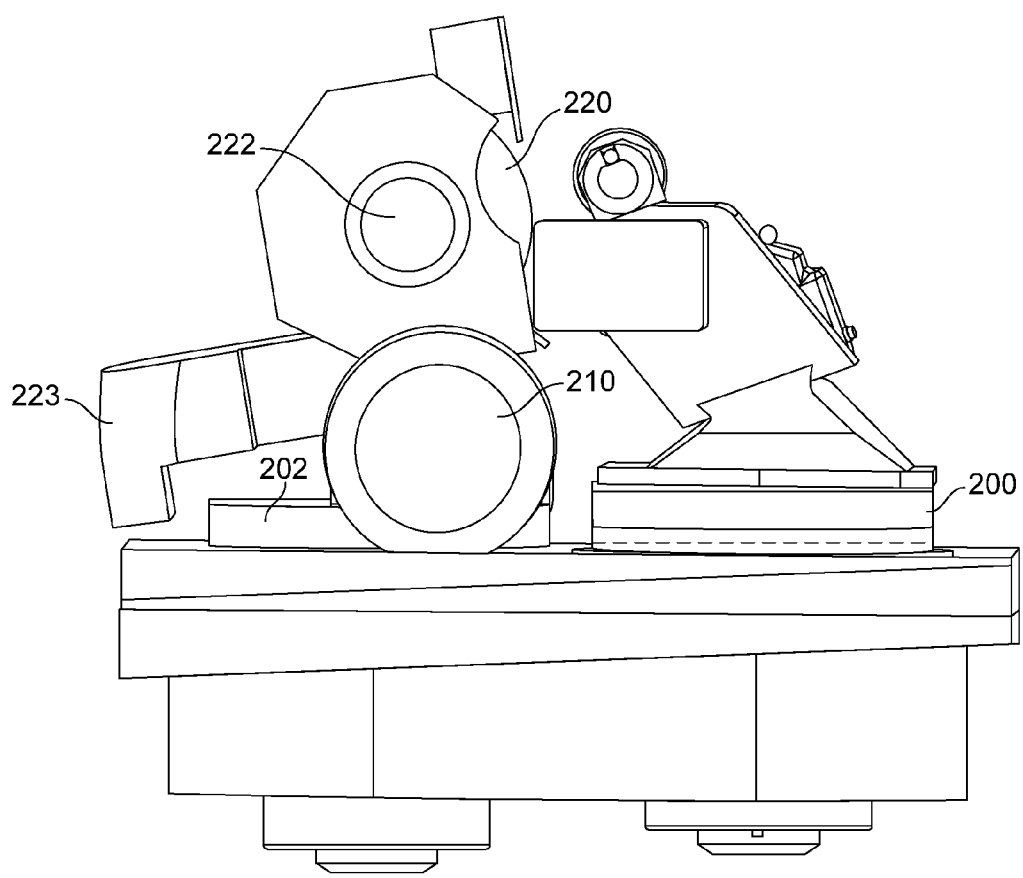
FIGS. 10 and 11 are side and perspective views, respectively, of a machine tool embodying the present invention and having a grinding wheel moveable about a horizontal rotary axis.
Figure 11:
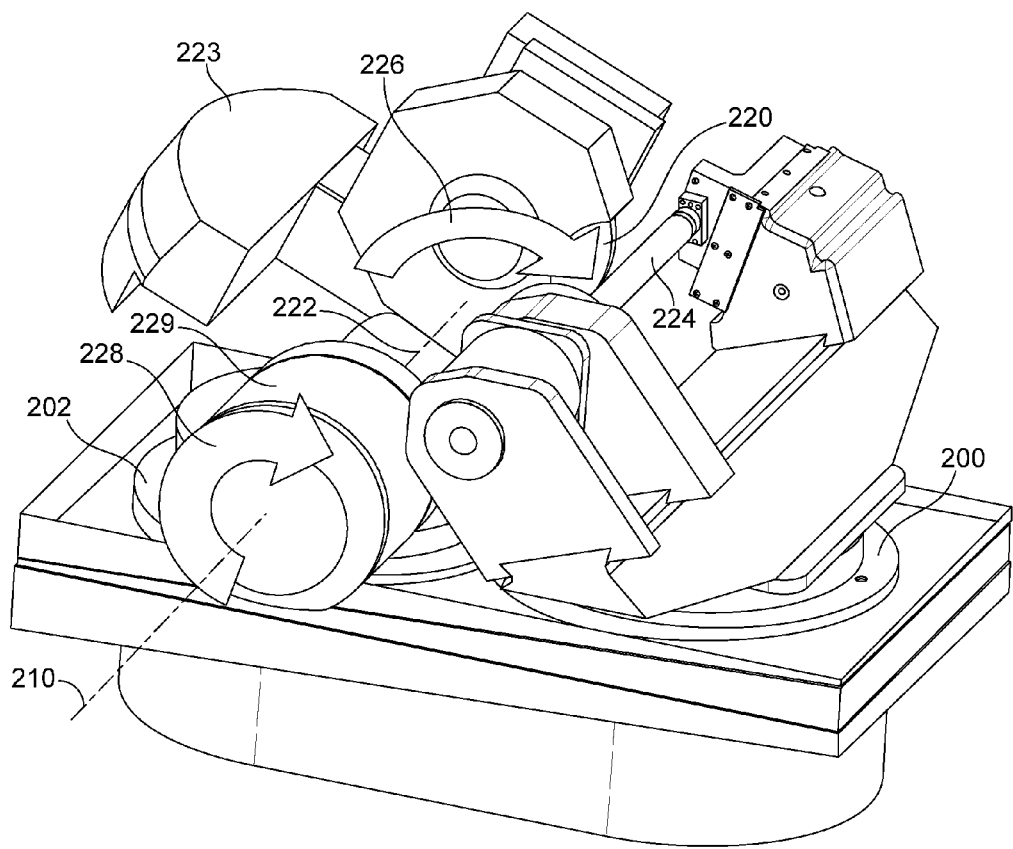

A grinding machine embodying the present invention is shown in FIGS. 10 and 11. A grinding wheel 220 is provided with its rotational axis 222 in a horizontal orientation and spaced from horizontal rotary axis 210 by a support arm (not visible in these Figures). A workpiece 224 is mounted on the other support 202 (visible in FIG. 11). Arrow 226 denotes movement of the axis of the grinding wheel along an arc as a result of its motion relative to rotary axis 210, with rotation about this axis being identified by arrow 228.

The horizontal component of the motion of the grinding wheel about rotary axis 210 achieves the same horizontal correction motion as the linear machine axis present in machine tools described in WO2009/093064.

Preferably, the third rotary axis drive motor 229 is mounted on the second support 202 with its centreline parallel to the wheelhead axis 222, and in particular with its centreline coincident with the third rotary axis 210. A counterweight 223 is also carried by the third rotary axis to assist with control of the wheelhead position relative to that axis.

Figure 12:
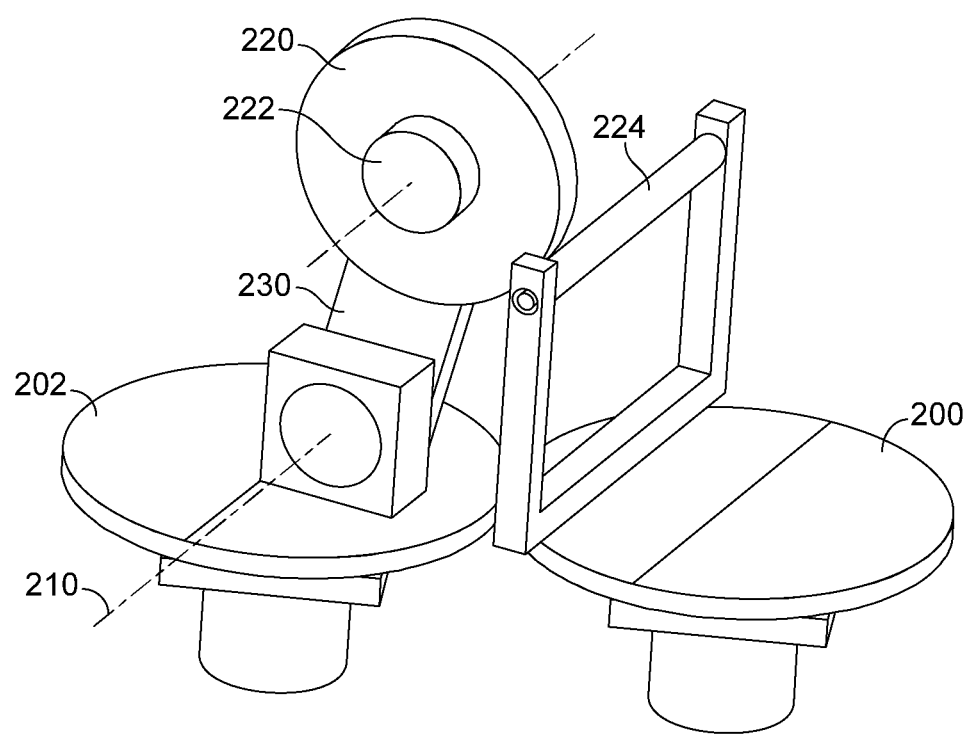
FIG. 12 is a simplified perspective view of a machine tool of the form shown in FIGS. 10 and 11.

FIG. 12 shows a CAD model that was used to demonstrate the control mathematics required to use the rotary motion about a horizontal rotary axis to provide corrective motion.

When this corrective motion is achieved using a linear axis to provide straight line motion between the grinding wheel and the workpiece, the linear correction data remain constant, regardless of the diameter of the part being ground or the diameter of the grinding wheel. With a machine configuration of the form shown in FIG. 12, the corrective motion required to maintain straight line motion (for example) changes with the grinding wheel diameter and the workpiece diameter. Rotary axis angles calculated using the CAD model are shown in the following table:

| | 400 mm wheel | | | 401 mm wheel | |
|---|---|---|---|---|---|
| | Third rotary axis angle | Range | | Third rotary axis angle | Range |
| 50 mm part | | | | | |
| −250 mm | 76.98826862 | 5.10805431 | −250 mm | 77.06186038 | 5.11138475 |
| 0 mm | 71.88021431 | | 0 mm | 71.95047563 | |
| 250 mm | 76.98826862 | | 250 mm | 77.06186038 | |

-continued

| 400 mm wheel | | | 401 mm wheel | | |
|---|---|---|---|---|---|
| | Third rotary axis angle | Range | | Third rotary axis angle | Range |
| 51 mm part | | | | | |
| −250 mm | 77.06186038 | 5.11138475 | −250 mm | 77.13546366 | 5.11471492 |
| 0 mm | 71.95047563 | | 0 mm | 72.02074874 | |
| 250 mm | 77.06186038 | | 250 mm | 77.13546366 | |

Two grinding wheel diameters (400 mm and 410 mm) and two component diameters (50 mm and 51 mm) were used. In the simulation, the grinding wheel was forced to maintain its grinding edge parallel to the longitudinal surface of the workpiece. It can be seen that the rotary axis angles required at the two component extreme ends (−250 mm and +250 mm) and at the centres (0 mm) change as the grinding wheel and component diameters change.

Thus, with knowledge of the grinding wheel and component diameters, the angular motion about the third rotary axis can be calculated in order to maintain the required motion profile between the cutting tool and the workpiece.

Figure 13:
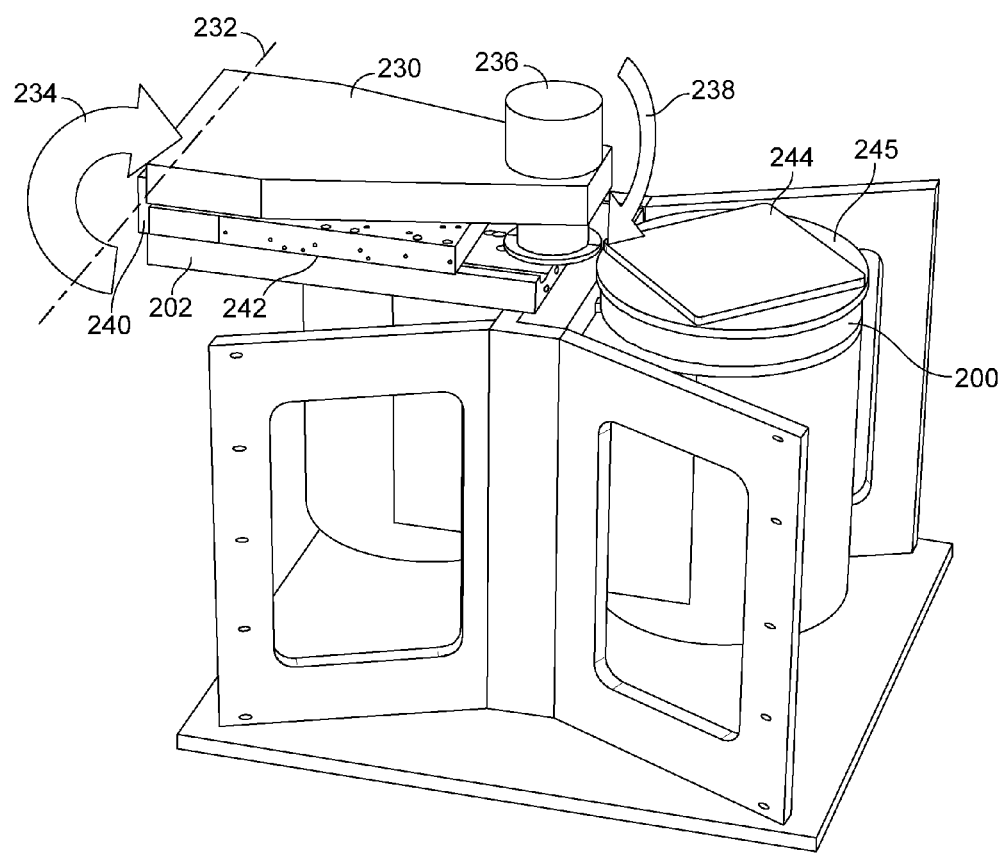
FIG. 13 is a perspective view of a further machine tool embodying the invention having a mount moveable about a horizontal rotary axis.

FIG. 13 shows another machine tool configuration in accordance with an embodiment of the invention. A support arm 230 is pivotable about a third rotary axis 232 in the manner indicated by arrow 234. In the arrangement depicted, a grinding wheelhead 236 is mounted at the distal end of the support arm such that its rotational axis is orthogonal to the third rotary axis and to the radial direction relative to that axis extending along the support arm. Pivoting of the arm about the axis 232 results in motion of the grinding wheelhead in an arc, indicated by arrow 238.

With the support in a generally horizontal orientation, movement of its distal end about the third rotary axis is primarily in the vertical direction.

A flexure 240 is used to facilitate rotation of support arm 230 about the rotary axis 232 in the configuration shown in FIG. 13, but it will be appreciated that any kind of rotary coupling could be employed, such as a rotary bearing. The rotary driving force may be provided by a wide range of options, including an on-axis motor, an off-axis motor (via a belt or gear drive for example), or a cam drive.

The support arm and flexure are mounted for movement along a linear axis 242 carried by the second support 202. This facilitates movement of the grinding wheelhead towards and away from a workpiece 244 mounted on the first support 200. This linear motion is also employed to correct for the horizontal component of the motion of the wheelhead about the third rotary axis 232.

As shown in FIG. 13, this movement about the third rotary axis may be used to raise and lower a grinding wheel orientated with its rotational axis substantially vertical (that is, orthogonal to the third rotary axis and the support arm). It may then be employed to form an edge profile on workpiece 244 (such as a silicon wafer), for example, or to move the wheel between a workpiece and a grinding wheel forming wheel 245 beneath it.

Figure 14:
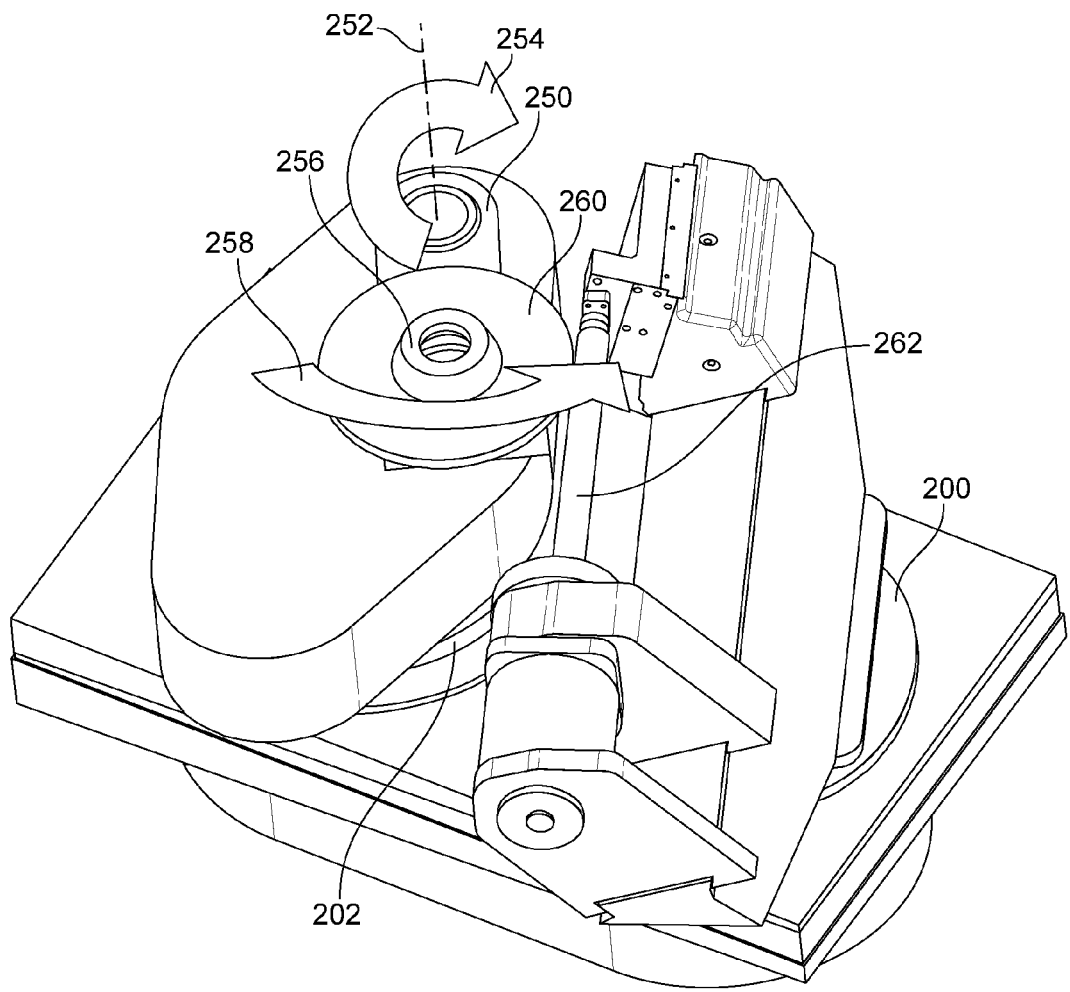
FIG. 14 is a perspective view of a machine tool embodying the invention in which a grinding wheel is moveable relative to the second support about a vertical rotary axis.

Another embodiment of the invention is depicted in FIG. 14. Here, a support arm 250 is rotatable about a third rotary axis 252. This axis has a vertical orientation, parallel with the axes of rotation of the first and second rotational machine axes. Movement of the support arm about this axis in the direction indicated by arrow 254 moves a grinding wheelhead 256 about the axis in an arc indicated by arrow 258. This serves to move a grinding wheel 260 mounted of the wheelhead horizontally towards and away from a workpiece 262 mounted on the first support 200.

In a similar manner to previous embodiments, a tool (in this case grinding wheel 260) can be moved along an elongate workpiece 262 by rotation of the respective supports 202, 200, with a component of the motion of the tool about the third rotary axis 252 in a direction perpendicular to the axis of the workpiece serving to provide corrective motion.

In the configuration shown in FIG. 14, it can be seen that the height of the mount at the end of support arm 250 remains constant during the operation of the machine. This means that the corrective calculations described above in relation to FIG. 12 are not required.

Also, if the arm 250 only moves a few degrees either side of an orientation parallel with the axis of the workpiece during a machine operation, there is only a second order deviation from the desired straight line motion perpendicular to that axis. Therefore, when carrying out operations that only require small movements perpendicular to a workpiece axis, an arrangement of the form shown in FIG. 14 employs a third rotary axis to provide motion close to that of a linear axis, whilst employing rotary axes only.

FIGS. 15 to 18 show machine tools embodying the present invention which include two tool mounts. Each tool mount is carried by a respective support arm 230, 230'. In these embodiments, the tool mounts are arranged to carry respective grinding wheels to 220, 220', with movement thereof about the third rotary axis 210 providing a respective grinding infeed. This allows each grinding wheel to grind a different diameter simultaneously with the other.

A separate rotary drive is provided for each support arm together with an associated position encoder. Each grinding wheel is therefore able to operate completely independently of the other. Two features may therefore be ground at the same time on a workpiece, which may be employed for example in orbital crankpin grinding.

Support arm 230 is also mounted for linear movement along the rotary axis 210 to allow variation in the spacing in this direction between the two support arms.

Figure 15:
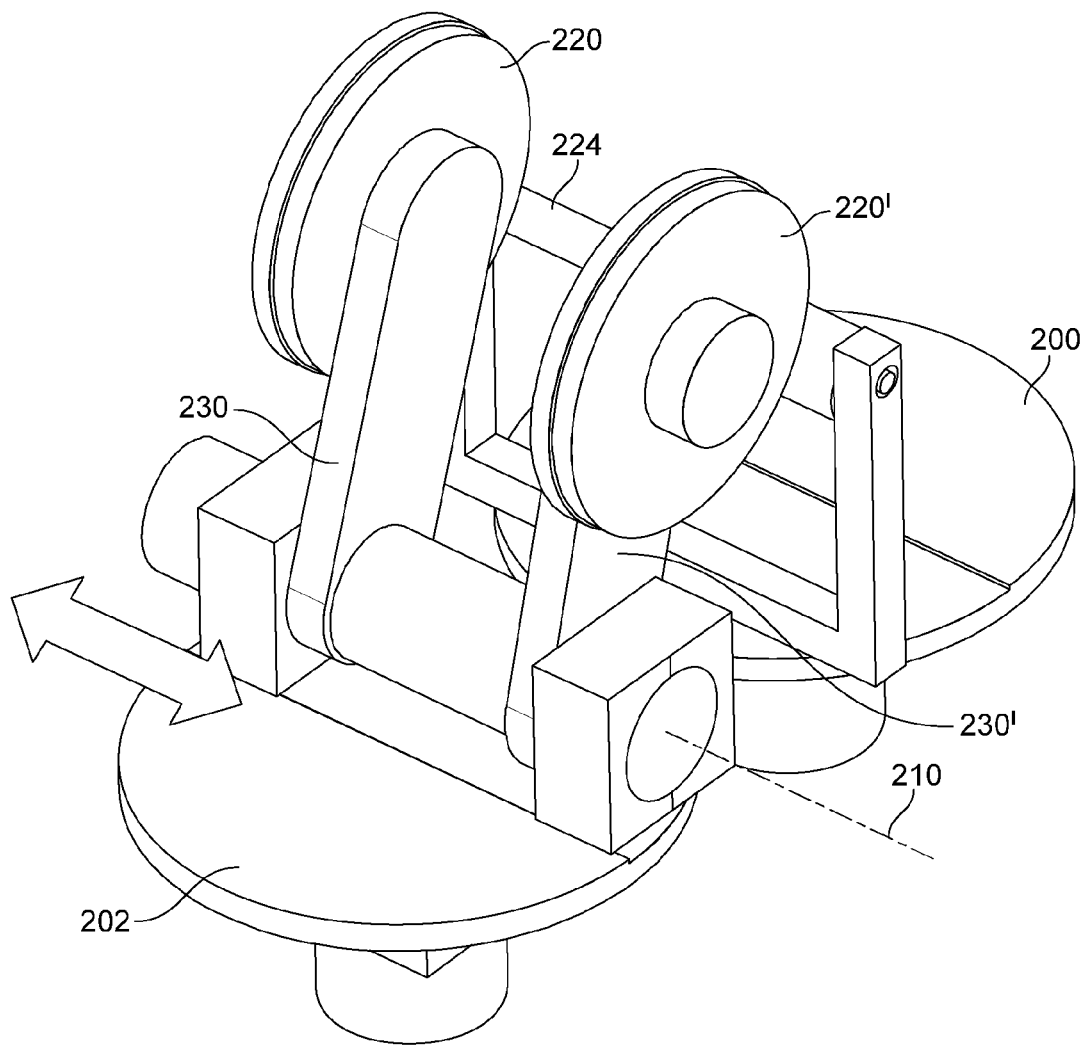
FIGS. 15 to 18 are perspective views of machine tools embodying the invention which include two support arms independently rotatable about a horizontal rotary axis.
Figure 16:
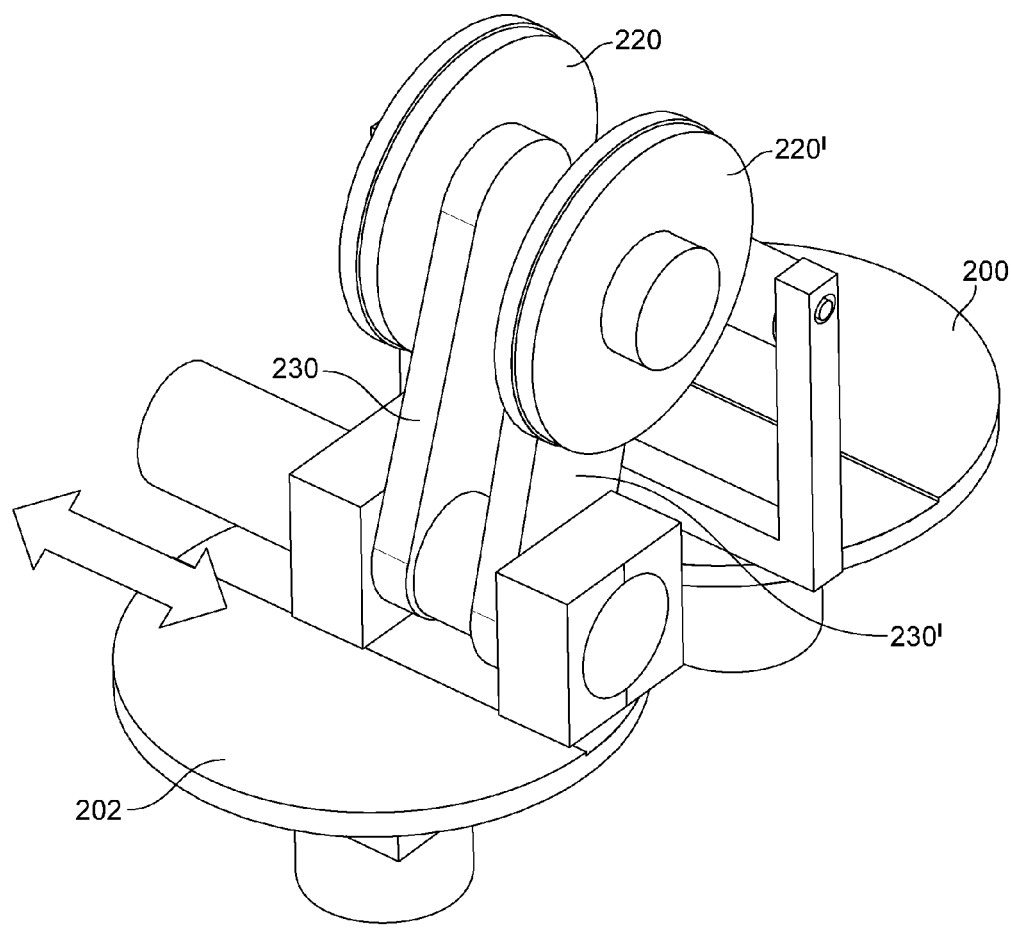
Figure 17:
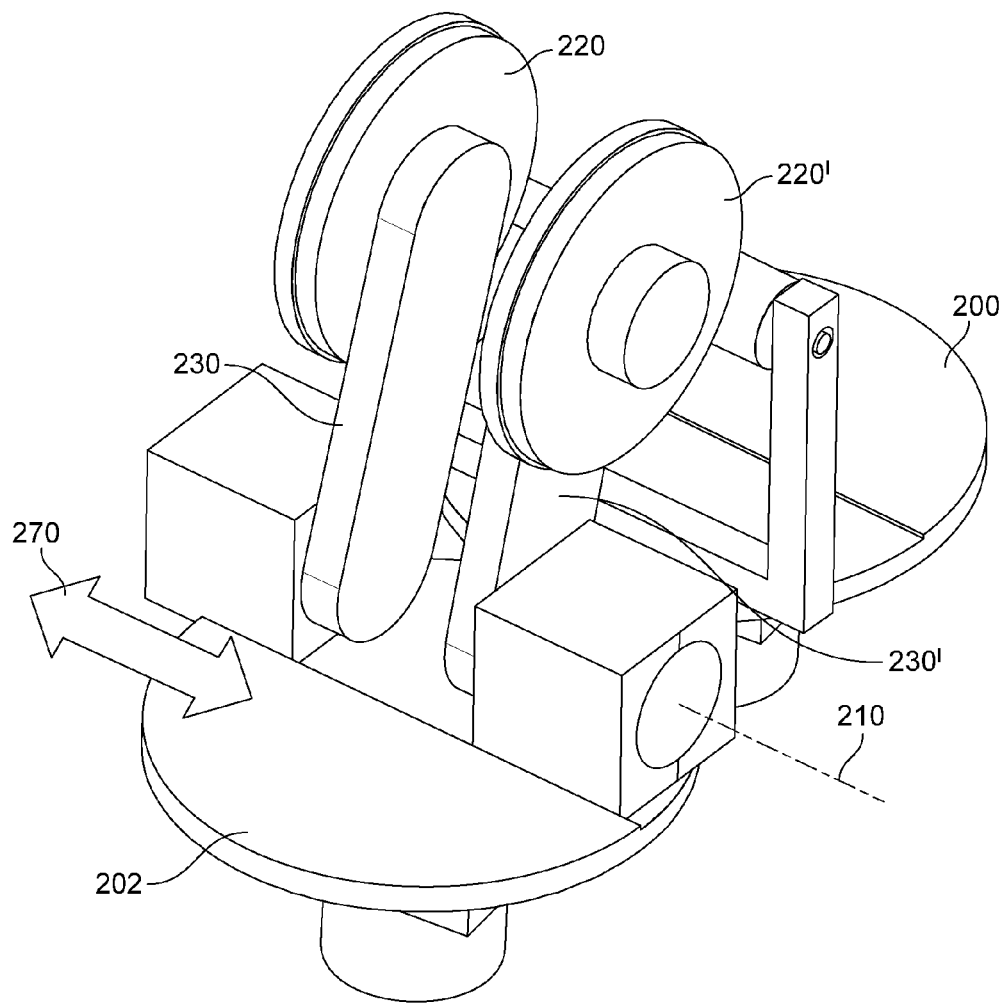

FIG. 16 shows a similar view to that of FIG. 15, except that support arm 230 has been moved along and parallel to the rotary axis 210 to be closer to support arm 230'.

In the configuration shown in FIGS. 15 and 16, the two support arms are supported by a common journal bearing shaft. In the embodiment depicted in FIG. 17, the two support arms 230, 230' are mounted on separate support shafts. Support arm 230 is mounted for movement along a linear axis parallel to the rotary axis 210, facilitating movement in the direction indicated by arrow 270. This facilitates control of the separation between the two support arms and the associated tools mounted thereon.

Figure 18:
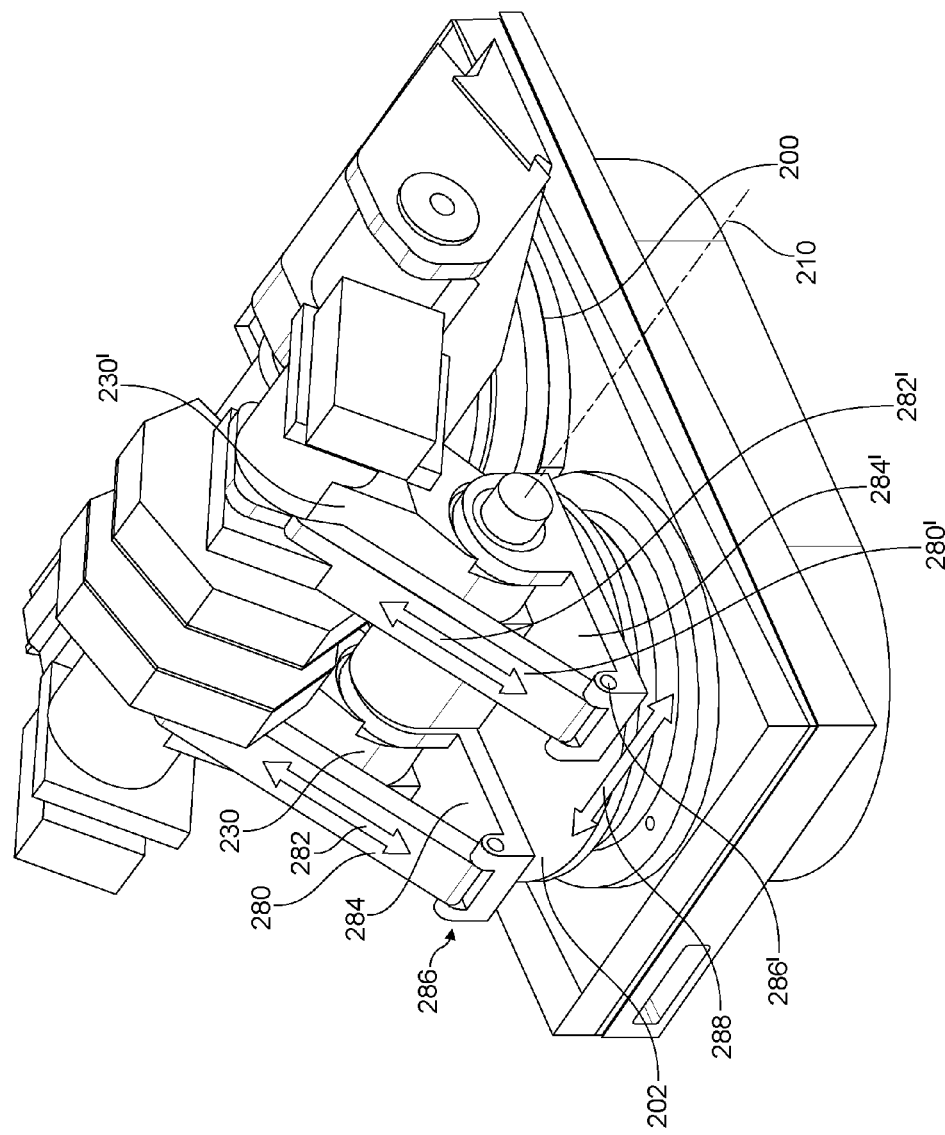

A further two mount configuration is shown in FIG. 18. Again, a pair of support arms 230, 230' are mounted for rotation about a third rotary axis 210. Instead of an on-axis rotary drive each support arm, in the configuration of FIG. 18, respective linear drive arrangements 280, 280' are provided, acting in directions indicated by arrows 282, 282'. Each linear drive is coupled to a respective mount 284, 284' via respective pivots 286, 286'. The other end of each linear drive is coupled to the corresponding support arm. Pivot mount 284' is moveable along a linear axis parallel to rotary axis 210 providing movement in a direction indicated by arrow 288. This provides control of the spacing between the support arms 230, 230' and the associated tools.

Figure 19:
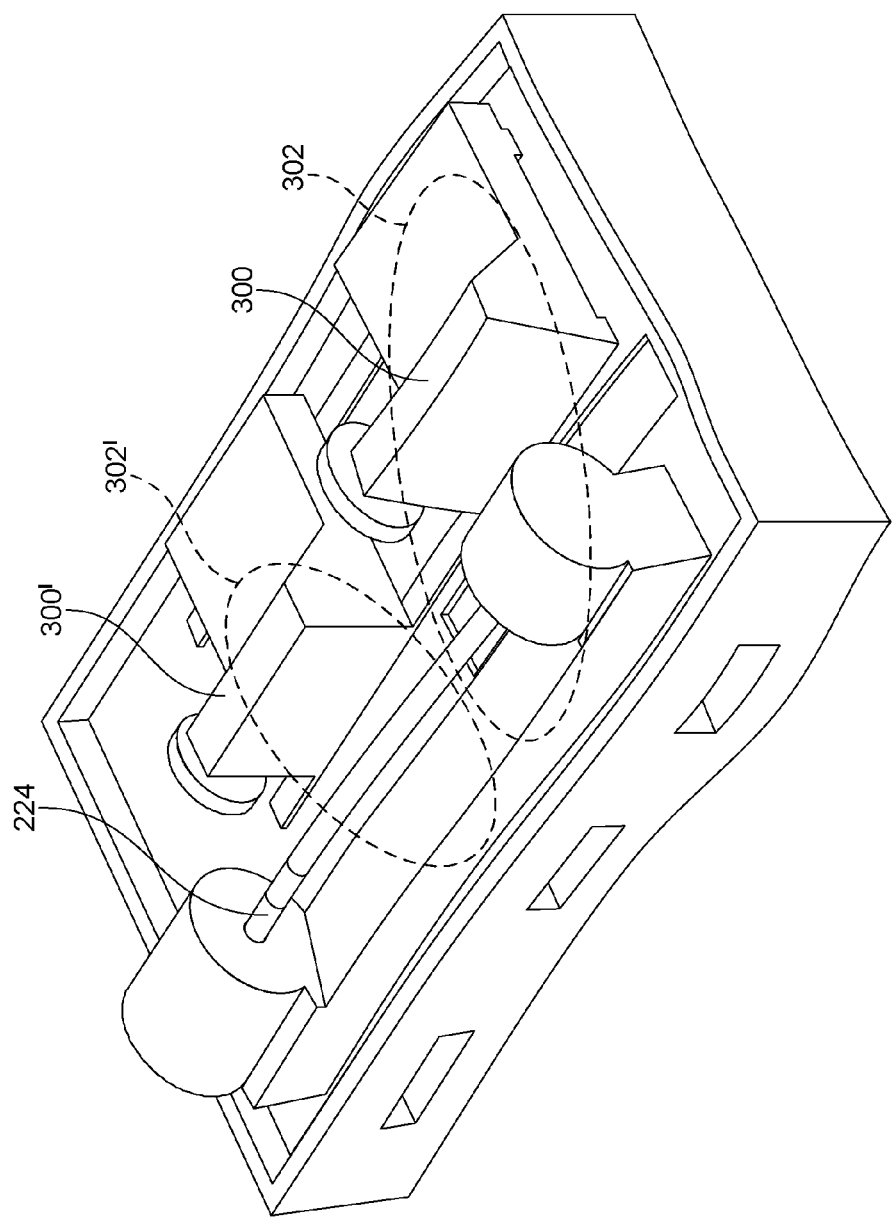
FIG. 19 is a perspective view of a known grinding machine to illustrate its variable thermal loop.

A further aspect of the present invention will now be described with reference to FIGS. 19 and 20. A known grinding machine tool configuration employing long linear axes to grind an elongate workpiece 224 is shown in FIG. 19. A grinding wheelhead 300 is shown in two different locations 300, 300'. This movement will be required to facilitate engagement of the grinding wheel with the full length of the workpiece.

Each location 300, 300' has associated "thermal and stiffness loops", schematically indicated by ovals 302, 302' in FIG. 19. It is well known in this field that the stiffness loop is the shortest path through the machine's mechanical components and structure between the cutting tool and the component. The shorter the path, the stiffer the machine. The thermal loop is the shortest path through the machine's mechanical components and structure between the cutting tool and the component. The shorter the path the less susceptible to thermal distortions the machine will be.

It can be seen that the locations of the thermal loops 302, 302' are quite different. If grinding is started in position 300, this will lead to a temperature rise in this region of the machine relative to the remainder, so that as the wheelhead moves to position 300', a temperature gradient and associated alignment variations will be encountered.

A typical "throat" motion during a thermal cycle of this machine could be 0.25 mm. The throat is the section of the machine base that connects the grinding wheel mount to the component mount. It is the area that the grinding swarf and coolant collect in during the grinding process. The grinding swarf and coolant tend to heat the material of the throat underneath the grind zone. The region of the throat being heated changes, depending on the axial position along the components being ground. In the region of the throat being heated, the material expands, causing that region of the throat to open. Over time, the whole of the throat heats up, opening the throat. This can cause the grinding wheel position to move away from the component. The error motion will be largest where the throat is hottest. As there is no direct measurement of the position between the grinding wheel and the component, there is no feedback system to enable the errors caused by the opening throat to be compensated for.

Figure 20:
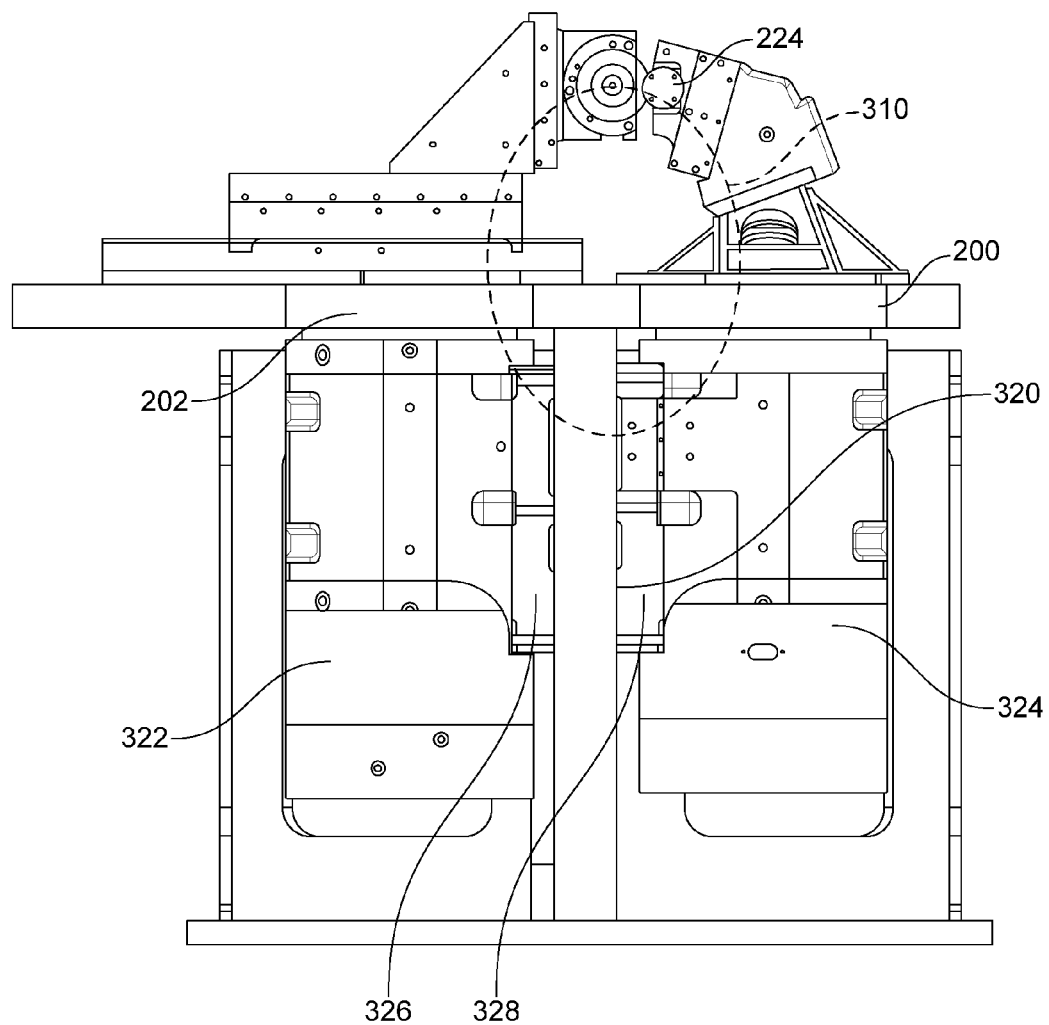
FIG. 20 is a side cross-sectional view of a machine tool according to a further aspect of the present invention which includes a central support for the two rotational machine axes.

A machine tool having two parallel rotational machine axes as described herein is shown in FIG. 20. An associated thermal/stiffness loop 310 is marked on the drawing. As the axes are rotated to present different parts of a workpiece 224 to a machine tool carried by support 202, the thermal loop 310 is substantially unchanged, thereby avoiding inaccuracies resulting from a variable thermal loop.

FIG. 20 illustrates a further aspect of the present invention, namely provision of a central support 320 between the rotational machine axes 322 and 324.

With a typical horizontal machine bed configuration, the axes are supported from below. In the arrangement of FIG. 20, each of the rotational machine axes is mounted onto a respective side of the support 320. Each machine axis is coupled to the adjacent side of the support by a mounting 326, 328, which extends horizontally between the respective axis and the support. The central support or slab thus carries the weight of each machine axis on either side. As a result, forces generated during operation of the machine tool act via the machine axes in opposite directions on the central support 320. Thus, the support resists these forces in a state of tension or compression, rather than in bending, as would be the case with a known machine bed. This results in a substantially constant (and potentially stiffer) stiffness loop in the machine tool irrespective of the orientations of the support 200, 202. This serves to reduce further errors during operation of the machine.

Figure 21:
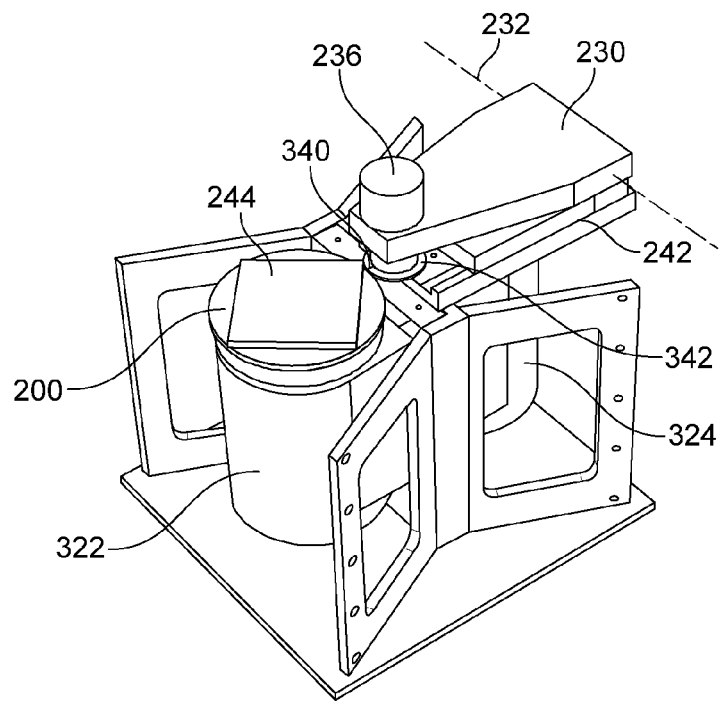
FIGS. 21 to 26 are perspective views of a machine tool of the form shown in FIG. 13 in different orientations.
Figure 22:
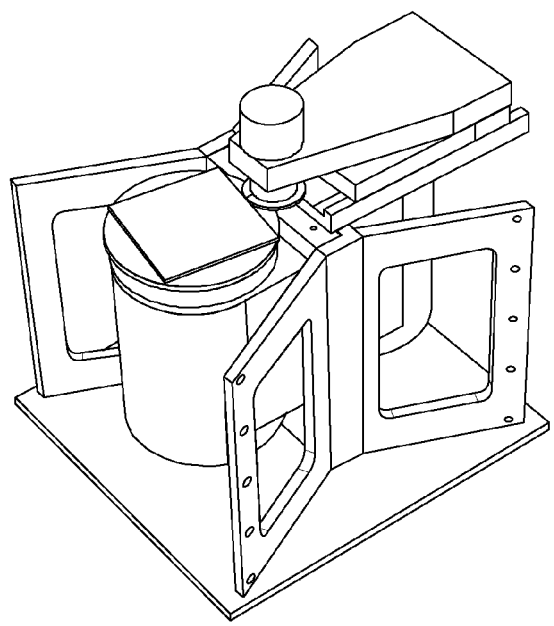
Figure 23:
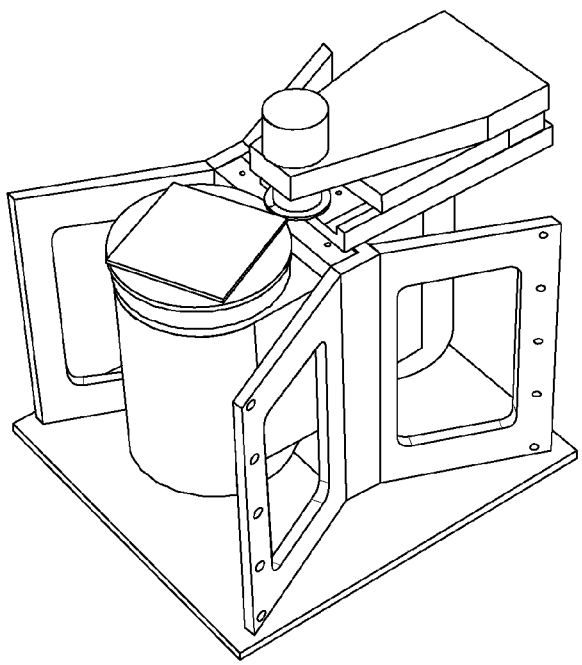

An advantage associated with the machine configuration of FIG. 13 will now be discussed with reference to FIGS. 21 to 26. FIGS. 21 to 23 shows successive positions of the machine tool when employed to grind a side of a rectangular tile 244 by way of example. In FIGS. 21 to 23, grinding wheelhead 236 is moved along linear axis 242 only, with the rotational position of support 202 about the axis of rotation of the respective rotational machine axis 324 unchanged.

By considering the reference line 340 marked over the grinding wheel 342, it can be seen that the point of contact between the wheel and tile changes continuously as the wheel moves along the side of the tile. Thus, it is not possible to set up coolant nozzles such that they provide optimum cooling and flushing during the complete grind of the tile. An articulated coolant nozzle mount would be required to be able to track the contact point.

Figure 24:
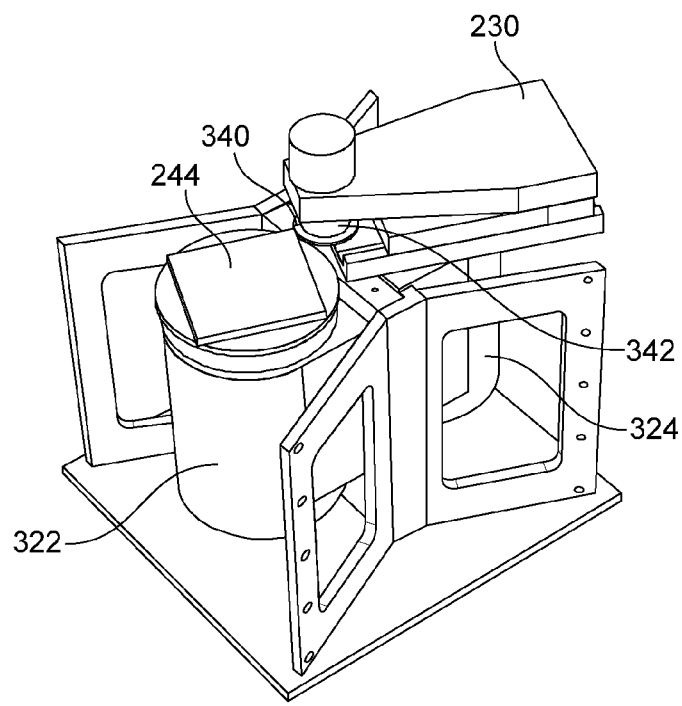
Figure 25:
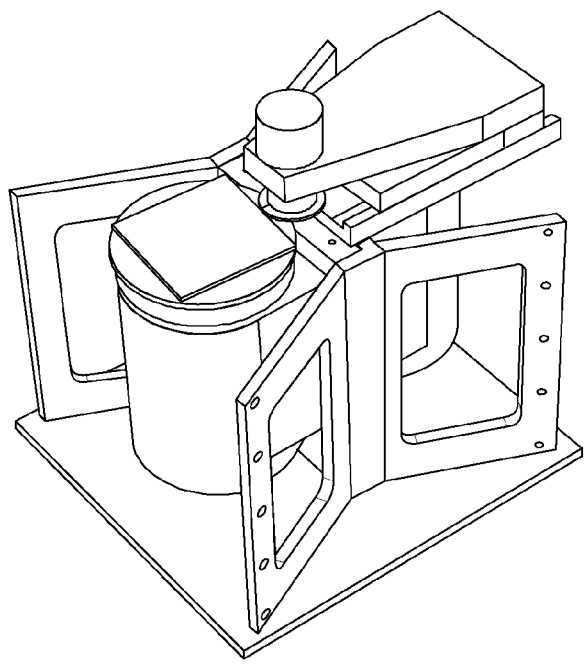
Figure 26:
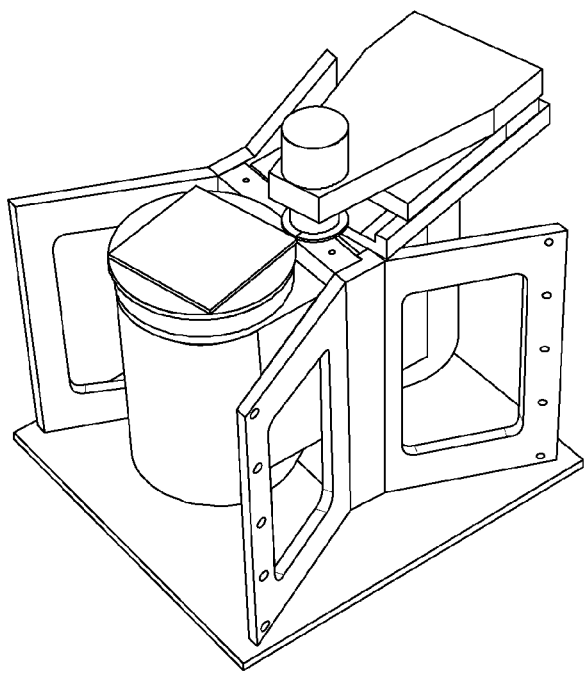

In contrast, in FIGS. 24 to 26, rotary movement by the grinding wheelhead mount is afforded by the rotational axis 324. As a result, it can be seen that the point of contact between the wheel 342 and the workpiece 244 is constant and always at the end of reference line 340. This facilitates maintenance of optimum coolant application conditions in all parts of the grinding operation, as the optimum coolant nozzle location is fixed relative to the support arm 230.

FIGS. 27 to 32 are taken from WO2009/093064. They illustrate capabilities of the machine tool described therein achievable using its configuration of two parallel rotational machine axes, with a linear axis mounted on one of the rotational axes. It will be appreciated that the component of motion provided by the linear axis in the illustrated configurations can be provided in accordance with the present invention by means of a third rotary axis. Accordingly, a description of these Figures is included below.

Figure 27:
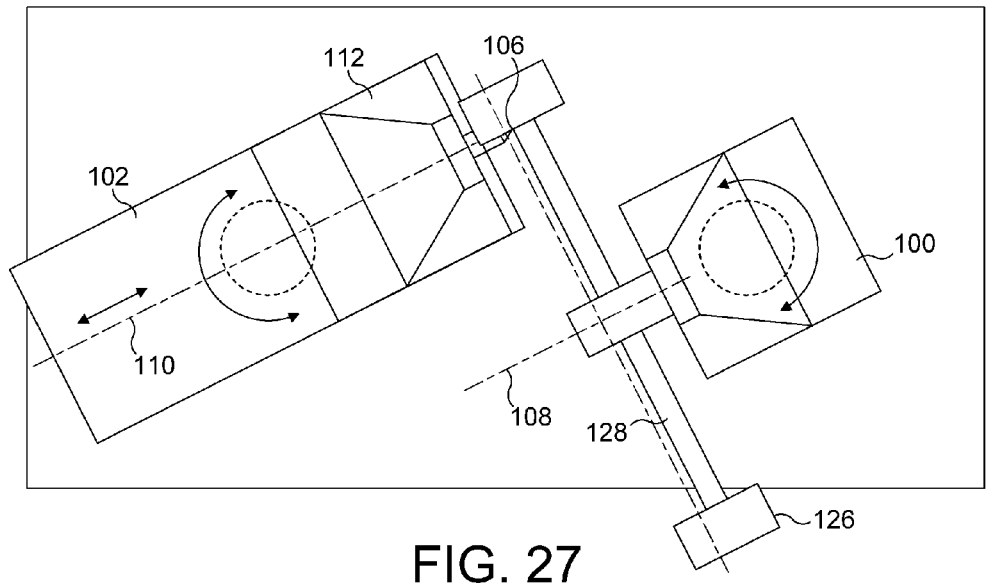
FIGS. 27 to 32 are taken from WO2009/093064 to illustrate features and capabilities of the machine tools described therein which are also applicable to embodiments of the present invention.

In the machine tool depicted in FIG. 27, the linear machine axis is mounted upon a rotary axis. This enables the supports 100, 102 and mount 112 to be orientated such that the reference axes 108, 110 are parallel prior to movement of reference point 106 along the workpiece shoulder. This movement is then achieved by movement of mount 112 along its linear machine axis alone.

Motion with respect to the three machine axes may be interpolated in order to enable access by reference point 106 to the length of the elongate workpiece 128.

Figure 28:
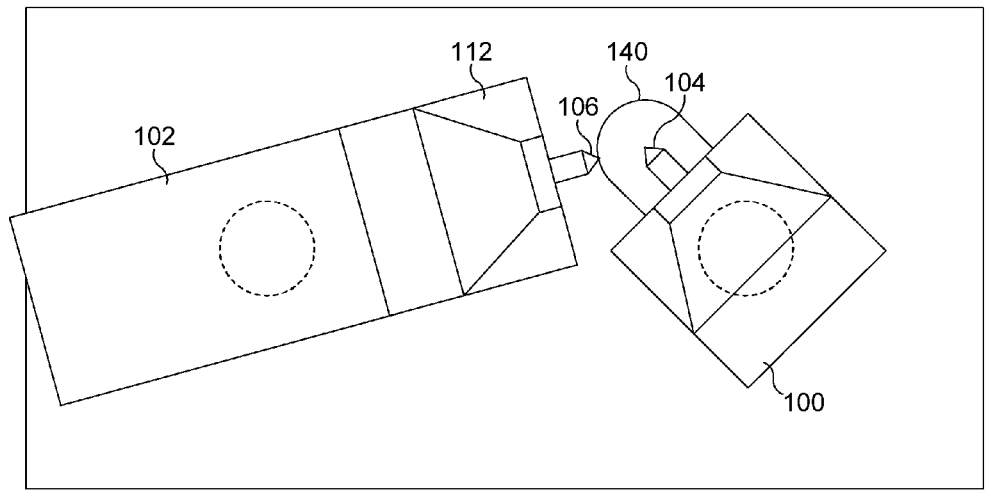

FIG. 28 shows reference point 106 defining a spherical surface 140 equidistant from reference point 104 whilst maintaining its reference axis 110 in a perpendicular "tool normal" orientation with respect to that surface.

The maintenance of "tool normal" is a common requirement for successful diamond turning of high precision components. It is often essential (in order to maintain component geometry and constant cutting conditions) that the same point on the tool remains in contact with the component being machined at all times.

Figure 29:
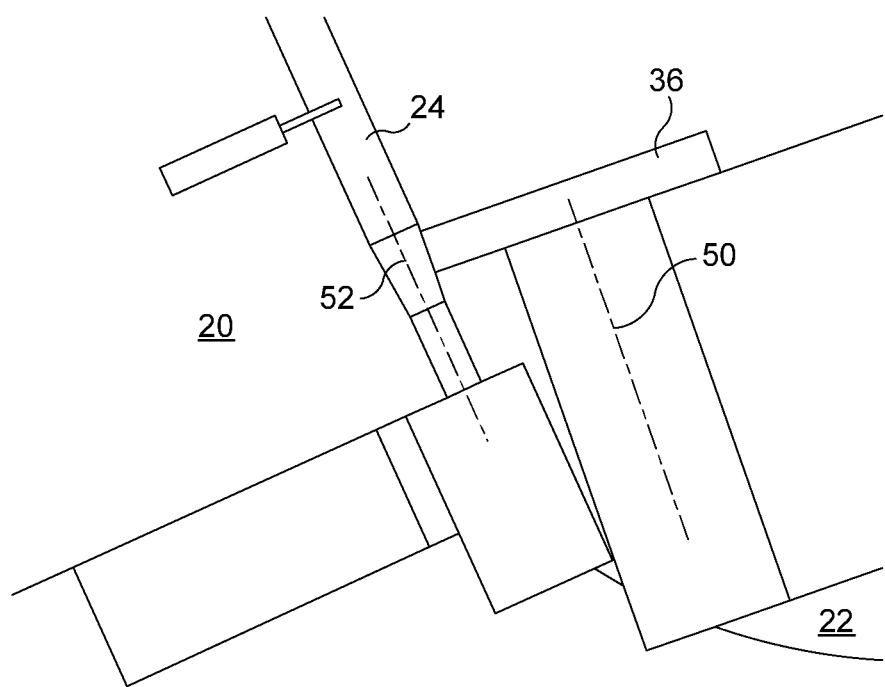

FIG. 29 illustrates how adjustment of the relative rotational orientations of the tool support 22 and workpiece support 20 can be used to create an angle between the rotational axis 50 of a grinding wheel 36 and the longitudinal axis 52 of a workpiece 24, to facilitate formation of a tapered profile on the workpiece. This principle can also be used to generate other profiles or forms, such as crown profiles on roller bearings.

Figure 30:
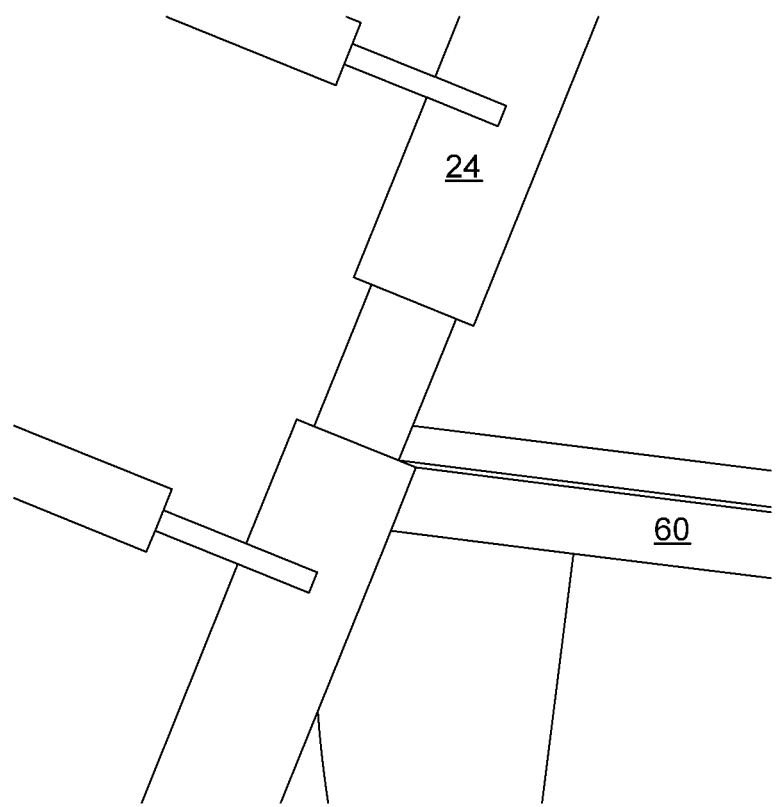

FIG. 30 illustrates how a pre-formed grinding wheel 60 may be employed using a machine tool embodying the invention to form predetermined profiles on a workpiece 24.

The machine base may be formed from granite, cast iron or polymer concrete for example and its fabrication may be relatively inexpensive in comparison to a base for an existing machine tool employing long linear axes.

During construction of a machine tool according to the invention, the precision of the interpolated linear motion between a cutting tool and a workpiece may be measured and any compensation required calculated. This compensation may be incorporated into the instructions governing operation of the controller of the machine tool, for example in software.

Laser calibration may be employed with regard to angle, linear position and straightness, enabling error correction of movement with respect to the rotary and linear axes.

Figure 31:
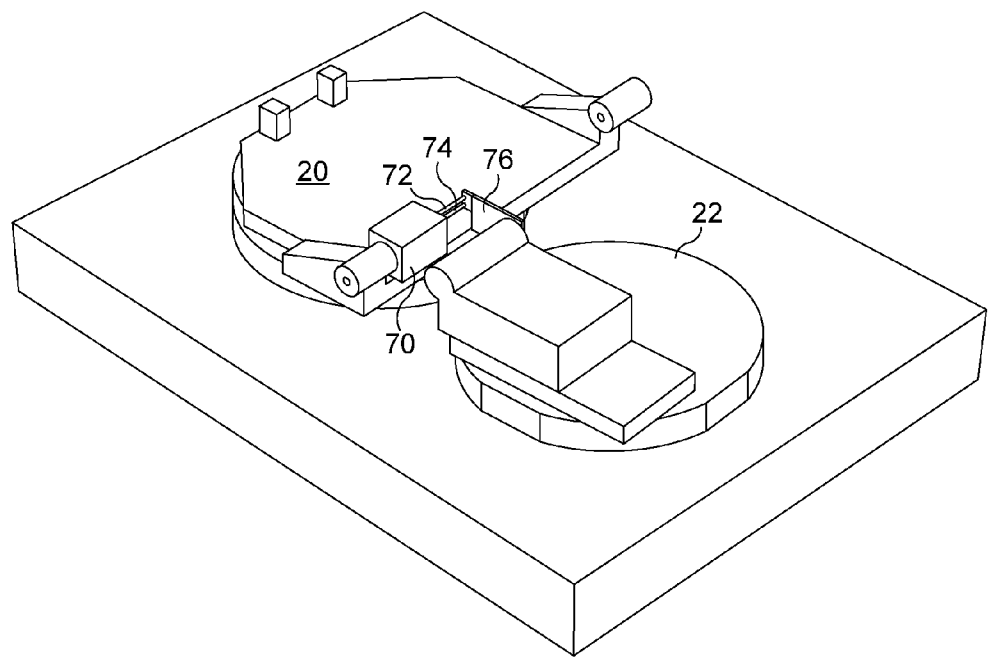
Figure 32:
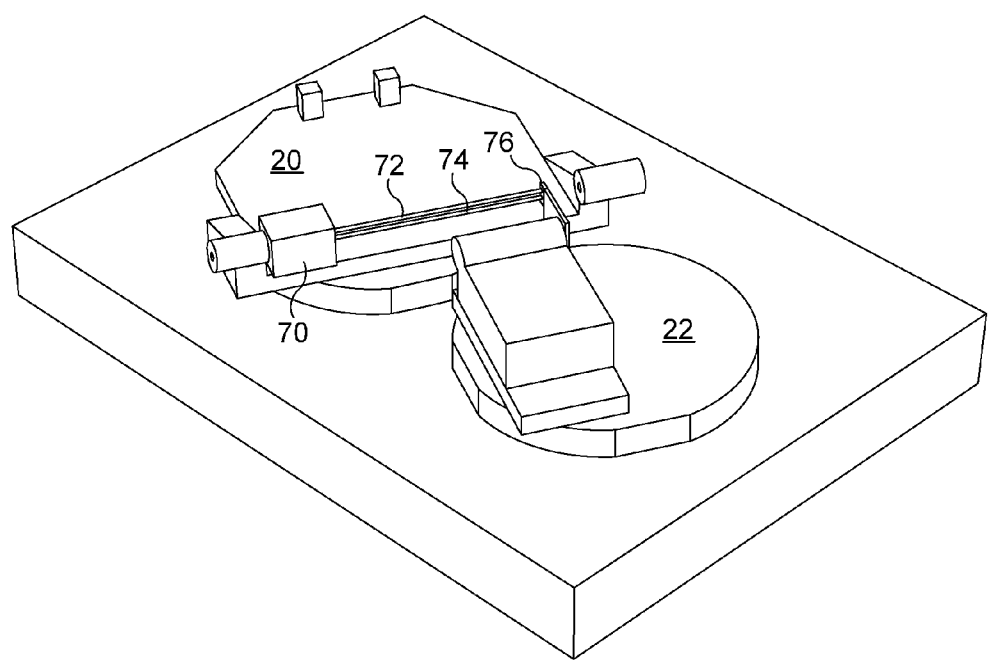

FIGS. 31 and 32 show how the machine can be laser calibrated. A light source 70 is mounted on headstock 26 which generates two parallel laser beams 72, 74 which are incident on a detector 76 carried by the tool support 22.

By moving the two rotary axes and the one linear axis, it is possible (using various sets of laser optics) to measure straightness, position and angle errors and to make correction to compensate for the errors. The correction procedures will vary depending upon the primary requirements for any given workpiece (for example parallelism, diameter or axial position of the feature being machined).

The calibration procedure could include the following steps:
 I. Using angular error measurement optics:
   i. Rotate the two axes, slaving the secondary (for example the tool support axis) to the primary axis (for example the workhead support axis) over the full range of motion required to machine the longest component. The linear axis will also be slaved to the primary axis in order to maintain a constant position of the laser beam on the measurement optics.
   ii. Angular errors will affect:
     1. The diameter of the feature being machined;
     2. The parallelism of the feature being machined;
     3. The axial position of the feature being machined.
   iii. Any measured angular error can be compensated for by modifying the motion of the secondary axis relative to the primary axis.
   iv. This procedure will minimize the rotary axis errors (from each encoder) and any additional rotary errors, for example from bearing axis tilt errors and yaw error of the linear axis.
 II. Using linear position measurement optics:
   i. Repeat the motion procedure for (I).
   ii. Linear position errors will affect the axial position of the feature being machined.
   iii. If axial position of a feature is of higher priority than parallelism of the feature being machined, then the measured position errors can be compensated (using the secondary rotary axis). This will add slightly to the angular position errors that were minimized during procedure I.
     1. The additional angular error could be relatively insignificant. For example, to correct for a 3 micron axial position error requires (approximately) a 1 arc sec angular correction. 1 arc second over a feature of 50 mm long would result in a taper of 0.25 micron.
 III. Using the straightness measurement optics to determine horizontal straightness errors:
   i. Repeat the motion procedure.
   ii. Linear straightness errors will affect the diameter of the feature being machined.
   iii. Measured horizontal straightness errors can be directly compensated for using the linear axis.

These procedures enable the error motion correction without the need to align orthogonal axes, a key benefit of this machine design.

Preferably, the rotational position of each rotational axis is monitored using respective rotation sensors separate from those used during normal operation of the machine tool. Thus these dedicated calibration sensors facilitate calibration independently of the normal sensors. The calibration process may then measure and enable correction of machine motion errors caused by the operation control sensors.

If the axial position of the machined features is particularly tight, a linear encoder may be employed (such as a laser interferometer mounted between the two rotary axes) as a secondary encoder to minimise the linear position errors caused by rotary encoder errors.

This may be achieved applying similar principles to those employed in the above calibration procedures.

Preferred embodiments of the machine tool use rotary encoders to synchronize motion between two rotary axes. It may be possible to maintain around 1 arc second absolute position error between the two axes. A rotary position error produces a linear error at a given radius of approximately 5 micron (of linear error) per meter (of radius) per arc second (of error). For a component around 1500 mm long, the radius from rotary axis centre to the end of the component may be around 900 mm, for example. This results in a linear position error (in the axial direction of the component) of around 3 micron per arc second of error.

In most cases this will be acceptable. However, for extremely demanding requirements (for example requiring no more than 1 micron of linear error) it may be preferable to make a direct, in-line linear error measurement (rather than an inferred linear measurement from a rotary encoder).

An example of a long range linear laser encoder is an RLE10, as marketed by Renishaw®. An encoder of this type could be used to provide linear position feedback as the two rotary axes move relative to each other. Thus, axial position errors resulting between the cutting tool and the component from rotary encoder errors can be measured directly as linear position errors.

The configuration of the linear encoder would be similar to that shown above in FIGS. 31 and 32 for the machine calibration procedure. However, the encoder's laser and target would need to be enclosed in a cover (not shown in the Figures), away from (probably below) the machining contact position.

The output signals from sensors employed during the calibration procedure are fed to the machine's control arrangement or to a dedicated calibration processing arrangement. The sensor signals are processed to identify any corrections that need to be applied to the control configuration of the machine tool to minimise any detected positioning errors.

Whilst the embodiments described with reference to the drawings are grinding machines, it will be appreciated that a broad range of machining-related operations can be implemented in accordance with the invention. In addition to grinding operations, other applications are turning or polishing for example, and inspection of machined components.

It will be appreciated that references herein to orthogonal or parallel relative orientations and the like are to be interpreted as defining substantially orthogonal or parallel relationships between components within practical tolerances.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

The invention claimed is:

1. A machine tool, comprising:
a machine base;
a first support provided on a first rotational machine axis, the first rotational machine axis being rigidly mounted on the base in a fixed position relative to the base and comprising a first drive operable to rotate the first support about a first axis of rotation;
a second support provided on a second rotational machine axis, the second rotational machine axis being rigidly mounted on the base in a fixed position relative to the base and comprising a second drive operable to rotate the second support about a second axis of rotation, wherein the second axis of rotation of the second rotational machine axis is parallel to and spaced laterally from the first axis of rotation of the first rotational machine axis, and further wherein one of the first or second supports is configured to carry one of a tool, a gauge or a sensor;
a mount carried by a support arm on the second support, the support arm being moveable relative to the second support by a third rotational machine axis, with the third rotational machine axis comprising a third drive operable to rotate the support arm about a third axis of rotation, the mount being spaced from the third axis of rotation by the support arm, and the third rotational machine axis being oriented such that movement of the support arm about the third axis of rotation has a component of motion of the support arm that provides an infeed of the mount in a direction that is perpendicular to the first and second axes of rotation and is towards the first support and away from the second support, wherein the third rotational machine axis is the only machine axis able to move the mount in said direction of the infeed; and
a control arrangement operable to control the orientation of the first support about the first axis of rotation of the first rotational machine axis, the orientation of the mount about the second axis of rotation of the second rotational machine axis, and the rotational position of the support arm relative to the second support about the third axis of rotation of the third rotational machine axis, using the first, second and third drives, respectively, so as to govern the position and orientation of the first support and the mount relative to each other.

2. A machine tool of claim 1, wherein the third axis of rotation of the third rotational machine axis is orthogonal to the second axis of rotation of the second rotational machine axis.

3. A machine tool of claim 1, wherein the third axis of rotation of the third rotational machine axis is parallel to the second axis of rotation of the second rotational machine axis.

4. A machine tool of claim 1, wherein the first and second supports are independently rotatable about the respective first and second axes of rotation of the first and second rotational machine axes.

5. A machine tool of claim 1, wherein the first and second supports are arranged for rotation about the respective first and second axes of rotation of the first and second rotational machine axes such that rotational movement of one of the first or second supports in one direction is substantially matched by rotation of the other of the first or second supports, but in the opposite direction.

6. A machine tool of claim 1, wherein the rotational positions of the first and second supports are selectively lockable relative to the machine base.

7. A machine tool of claim 1, wherein the first and second supports are supported on the machine base via journal and thrust bearings.

8. A machine tool of claim 1, wherein the first and second supports are rotatable relative to the machine base by respective direct drive motors.

9. A machine tool of claim 1, wherein each of the first and second supports includes a rotation sensor for providing a signal related to the rotational position of the respective first and second supports relative to the machine base, and the control arrangement is operable to receive the signals from the rotation sensors, and to compensate for inaccuracy in the motion of the first and second supports during a machining operation.

10. A machine tool of claim 1, wherein the movement of the support arm relative to the second support about the third axis of rotation of the third rotational machine axis is provided by a rotary bearing.

11. A machine tool of claim 1, wherein the movement of the support arm relative to the second support about the third axis of rotation of the third rotational machine axis is provided by a flexure.

12. A machine tool of claim 11, wherein the flexure is moveable relative to the base along a linear axis parallel to the base.

13. A machine tool of claim 1, wherein one of the first or second supports carries a tool mount.

14. A machine tool of claim 13, wherein two tool mounts are carried by one of the first or second supports, each of the two tool mounts being moveable relative to the one of the first or second supports independently of the other.

15. A machine tool of claim 14, wherein each tool mount is carried by a respective support arm on the second support, each support arm being independently moveable relative to the second support about a respective axis of rotation.

16. A machine tool of claim 15, wherein each support arm is mounted on a common shaft.

17. A machine tool of claim 14, wherein at least one of the tool mounts is also moveable relative to the one of the first or second supports along a linear axis.

18. A machine tool of claim 13, wherein the other of the first or second supports is arranged to support an elongate workpiece with its longitudinal axis in a plane orthogonal to the respective first and second axes of rotation of the first and second rotational machine axes.

19. A machine tool of claim 13, wherein one of the tool mounts is in the form of a grinding wheel spindle.

20. A machine tool of claim 19, wherein the rotational axis of the spindle is parallel to the third axis of rotation.

21. A machine tool of claim 19, wherein the rotational axis of the spindle is orthogonal to the third axis of rotation.

22. A machine tool of claim 1, wherein the machine base comprises a central support located between the first machine axis and the second machine axis, and the first and second machine axes are mounted onto opposite sides of the central support.

23. A method of machining a workpiece using a machine tool of claim 1, comprising the steps of:
    mounting a workpiece on one of the first or second supports;
    mounting a cutting tool on the other of the first or second supports;
    rotating the first and second supports to present a selected portion of the workpiece to the cutting tool; and
    machining the selected portion of the workpiece with the cutting tool.

24. A method of claim 23, including the further steps of:
    rotating the first and second supports in opposite directions and moving the workpiece and/or the cutting tool relative to the respective first or second support to engage a second portion of the workpiece with the cutting tool; and
    machining the second portion of the workpiece with the cutting tool.

25. A method of machining a workpiece using a machine tool of claim 1, comprising the steps of:
    mounting a workpiece having a longitudinal axis on one of the first or second supports;
    mounting a grinding wheel on the other of the first or second supports;
    rotating the other of the first or second supports such that the rotational axis of the grinding wheel is non-parallel with respect to the longitudinal axis of the workpiece; and
    grinding the workpiece with the grinding wheel with the rotational axis of the grinding wheel at an angle to the longitudinal axis of the workpiece.

26. A method of machining a workpiece using a machine tool of claim 1, comprising the steps of:
    mounting a workpiece on one of the first or second supports;
    mounting a tool having a reference axis on the other of the first or second supports; and
    moving the first support relative to the first axis of rotation of the first rotational machine axis, and the mount relative to the second axis of rotation of the second rotational machine axis and the third axis of rotation of the third rotational machine axis, such that a predetermined profile is machined on the workpiece by the tool whilst maintaining the reference axis of the tool perpendicular to said surface.

27. A method of calibrating a machine tool of claim 9, comprising the steps of:
    mounting a laser light source on one of the first or second supports;
    emitting a laser beam from the light source which is incident on an optical device supported by the other of the first or second supports;
    monitoring a laser beam path with respect to positions of the first and second supports as measured by the respective rotation sensors;
    calculating positioning errors; and
    calibrating the control arrangement so as to reduce the errors.

28. A machine tool, comprising:
    a machine base;
    a first support provided on a first rotational machine axis, the first rotational machine axis being mounted on the base in a fixed position relative to the base and comprising a drive operable to rotate the first support about a first axis of rotation;
    a second support provided on a second rotational machine axis, the second rotational machine axis being mounted on the base in a fixed position relative to the base and comprising a second drive operable to rotate the second support about a second axis of rotation, wherein the second axis of rotation of the second rotational machine axis is parallel to and spaced laterally from the first axis of rotation of the first rotational machine axis, and further wherein one of the first or second supports is configured to carry one of a tool, a gauge or a sensor;
    a mount carried by the second support and moveable relative to the second support; and
    a control arrangement operable to control the orientation of the first support about the first axis of rotation of the first rotational machine axis, and the orientation of the mount about the second axis of rotation of the second rotational machine axis, so as to govern the position and orientation of the first support and the mount relative to each other,
    wherein the machine base comprises a central support slab located between the first rotational machine axis and the second rotational machine axis, the plane of the slab being parallel with the first and second axes of rotation, and the first and second rotational machine axes are rigidly mounted onto opposite faces of the central support slab so that forces generated during operation of the machine tool act via the first and second rotational machine axes in opposite directions on the central support slab.

29. A machine tool of claim 28, wherein the weight of both of the first and second machine axes is substantially supported by the central support slab.

30. A machine tool of claim 28, wherein the mount is carried by a support arm on the second support, the support arm being moveable relative to the second support about a rotary axis, and the control arrangement is operable to control the rotational position of the mount about the rotary axis.

* * * * *